United States Patent
Subramanian et al.

(10) Patent No.: US 11,562,315 B2
(45) Date of Patent: Jan. 24, 2023

(54) DETECTING AN ISSUE RELATED TO A REPORT

(71) Applicant: Accenture Global Solutions Limited, Dublin (IE)

(72) Inventors: Revathi Subramanian, San Diego, CA (US); Kun Qiu, San Diego, CA (US)

(73) Assignee: Accenture Global Solutions Limited, Dublin (IE)

( * ) Notice: Subject to any disclaimer, the term of this patent is extended or adjusted under 35 U.S.C. 154(b) by 496 days.

(21) Appl. No.: 16/119,606

(22) Filed: Aug. 31, 2018

(65) Prior Publication Data

US 2020/0074359 A1    Mar. 5, 2020

(51) Int. Cl.
| | |
|---|---|
| *G06Q 10/06* | (2012.01) |
| *G06Q 10/10* | (2012.01) |
| *G06Q 40/00* | (2012.01) |
| *G06Q 30/04* | (2012.01) |
| *G06N 5/02* | (2006.01) |
| *G06F 16/387* | (2019.01) |
| *G06K 9/62* | (2022.01) |

(52) U.S. Cl.
CPC ......... *G06Q 10/067* (2013.01); *G06F 16/387* (2019.01); *G06K 9/6257* (2013.01); *G06N 5/02* (2013.01); *G06Q 10/10* (2013.01); *G06Q 30/04* (2013.01); *G06Q 40/12* (2013.12)

(58) Field of Classification Search
CPC .............................. G06Q 10/067; G06N 5/02
USPC ....................................................... 705/342
See application file for complete search history.

(56) References Cited

U.S. PATENT DOCUMENTS

| | | | |
|---|---|---|---|
| 7,437,327 B2 | 10/2008 | Lam et al. | |
| 8,589,227 B1 | 11/2013 | Bridge et al. | |
| 9,336,302 B1 * | 5/2016 | Swamy | ................. G06F 16/355 |
| 9,460,155 B2 | 10/2016 | Verma | |
| 9,535,917 B1 | 1/2017 | Lin | |
| 9,668,066 B1 | 5/2017 | Betts et al. | |
| 10,038,611 B1 | 7/2018 | Wu et al. | |
| 10,417,059 B1 | 9/2019 | Arya et al. | |
| 10,516,999 B1 | 12/2019 | Desai | |

(Continued)

OTHER PUBLICATIONS

CA Technologies, "Application and Infrastructure Monitoring Tools," https://www.ca.com/us/products/application-and-infrastructure-monitoring.html, Feb. 13, 2016, 11 pages.

(Continued)

*Primary Examiner* — Sangeeta Bahl
*Assistant Examiner* — Joshua D Schneider
(74) *Attorney, Agent, or Firm* — Harrity & Harrity, LLP

(57) ABSTRACT

A device may receive data that is related to historical reports associated with an organization, historical audits of the historical reports, and individuals associated with the historical reports. The device may determine a multi-entity profile for the data. The multi-entity profile may include a set of groupings of the data by a set of attributes included in the data. The device may determine, using the multi-entity profile, a set of supervised model features for the historical reports. The device may determine, using the multi-entity profile, a set of unsupervised model features for the historical reports independent of the historical audits. The device may determine, utilizing a model, a score for a report. The device may perform one or more actions.

20 Claims, 12 Drawing Sheets

(56) References Cited

U.S. PATENT DOCUMENTS

| | | | |
|---|---|---|---|
| 10,585,979 B2 | 3/2020 | Moyers | |
| 10,698,868 B2 | 6/2020 | Guggilla et al. | |
| 10,771,562 B2 | 9/2020 | Desai et al. | |
| 10,904,298 B2 | 1/2021 | Sondhi et al. | |
| 11,087,245 B2 | 8/2021 | Subramanian et al. | |
| 2002/0184123 A1 | 12/2002 | Sijacic et al. | |
| 2008/0154957 A1 | 6/2008 | Taylor et al. | |
| 2012/0084235 A1* | 4/2012 | Suzuki | G06N 20/00 706/12 |
| 2013/0346287 A1* | 12/2013 | Enzaldo | G06Q 40/02 705/38 |
| 2014/0278165 A1 | 9/2014 | Wenzel et al. | |
| 2016/0012688 A1 | 1/2016 | Eagleman et al. | |
| 2016/0117778 A1* | 4/2016 | Costello | G06N 20/00 705/4 |
| 2016/0299938 A1 | 10/2016 | Malhotra et al. | |
| 2016/0358268 A1* | 12/2016 | Verma | G06F 16/24564 |
| 2017/0084167 A1 | 3/2017 | Bump et al. | |
| 2017/0251007 A1* | 8/2017 | Fujisawa | H04L 63/1425 |
| 2018/0040064 A1 | 2/2018 | Grigg et al. | |
| 2018/0107941 A1 | 4/2018 | Siebel et al. | |
| 2018/0232814 A1 | 8/2018 | Dey et al. | |
| 2018/0322406 A1* | 11/2018 | Merrill | G06N 20/20 |
| 2018/0349250 A1 | 12/2018 | Debnath et al. | |
| 2018/0350006 A1* | 12/2018 | Agrawal | G06F 7/026 |
| 2019/0139147 A1 | 5/2019 | Mittal et al. | |
| 2019/0180389 A1 | 6/2019 | Hurst et al. | |
| 2019/0369570 A1 | 12/2019 | Sahinoglu | |
| 2020/0193234 A1 | 6/2020 | Pai et al. | |
| 2020/0265119 A1 | 8/2020 | Desai et al. | |

OTHER PUBLICATIONS

Hewlett Packard Enterprise Development LP, "HPE OneView," https://www.hpe.com/us/en/integrated-systems/software.html, 2018, 21 pages.

Extended European Search Report for Application No. EP19212369.3, dated Jan. 14, 2020, 9 pages.

AppZen, "Audit Every Dollar of Spend," Mar. 16, 2018, 7 pages, https://www.appzen.com/.

AppZen., "Using Artificial Intelligence to Automate Expense Report Audit, Fraud Detection, and Risk Compliance," Aug. 2016, 6 pages. Retrieved from Internet:[URL:https://cdn2.hubspot.net/hubfs/516015/docs/Whitepaper-AI-for-Business-AppZen-2016.pdf].

Cognilytica Research., "Innovative Approaches to Solving Expense Report Fraud with AI," AppZen, Apr. 2018, 8 pages. Retrieved from Internet:[URL:https://cdn2.hubspot.net/hubfs/516015/Cognylitica%20Whitepaper.pdf].

Kelly., "Disaggregation of Domestic Smart Meter Energy Data," University of London, 2016, pp. 1-251.

* cited by examiner

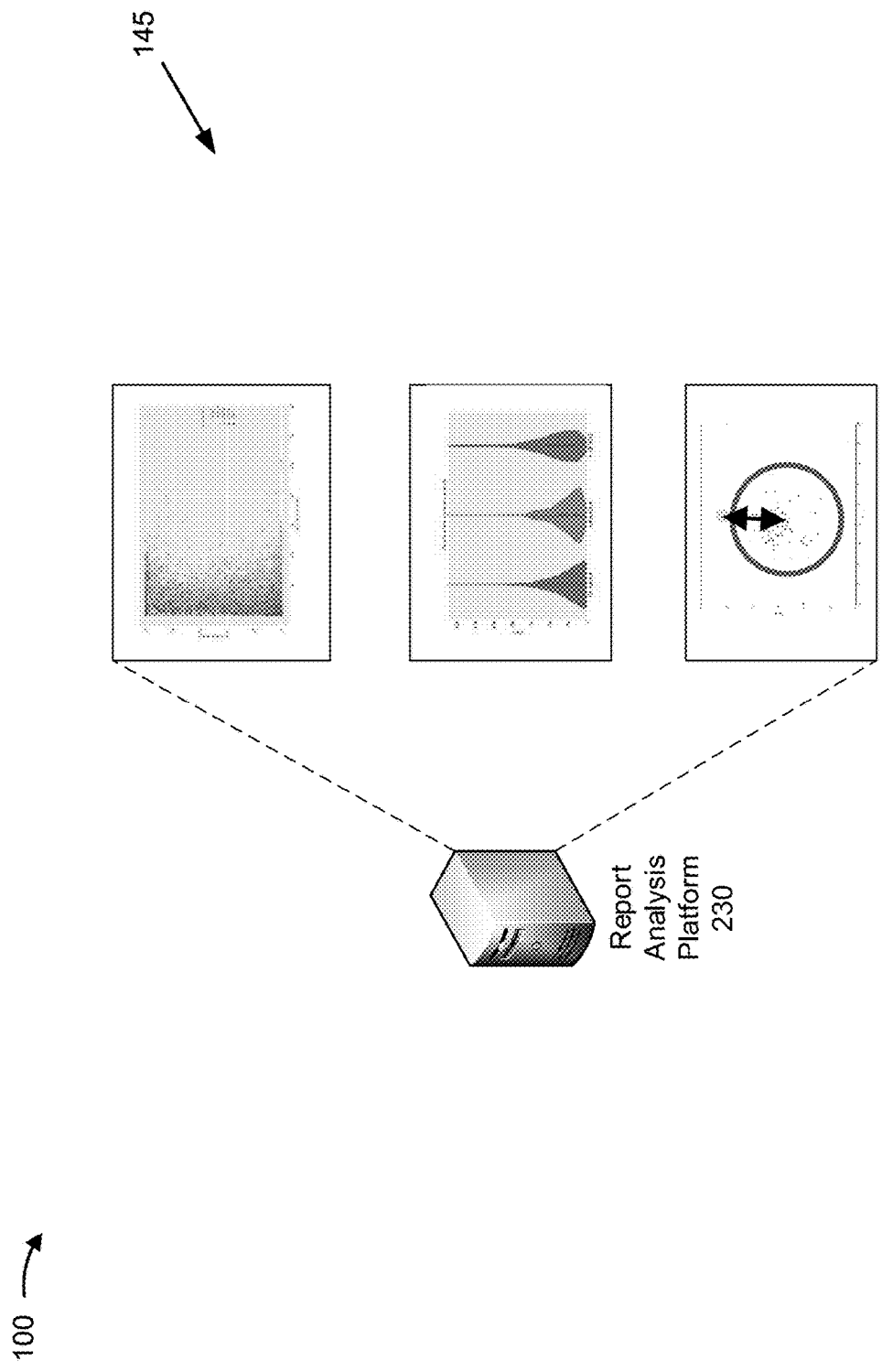

DETECTING AN ISSUE RELATED TO A REPORT

BACKGROUND

An organization may generate various types of reports related to operations of the organization. For example, the organization may generate expense reports, time reports, revenue reports, and/or the like. A report may be associated with an individual (e.g., that submitted the report, that is associated with the content of the report, and/or the like), a location (e.g., of a subject matter of the report, an individual associated with the report, and/or the like), an amount of value (e.g., of an expense for an expense report, of time for a time report, and/or the like), and/or the like.

SUMMARY

According to some possible implementations, a method may comprise receiving, by a device, data that is related to: historical reports associated with an organization, historical audits of the historical reports, and individuals associated with the historical reports; determining, by the device, a multi-entity profile for the data after receiving the data, wherein the multi-entity profile includes a set of groupings of the data by a set of attributes included in the data; determining, by the device and using the multi-entity profile, a set of supervised model features for the historical reports based on the historical audits, wherein the set of supervised model features is associated with training a model to process a report in a context of the historical audits; determining, by the device and using the multi-entity profile, a set of unsupervised model features for the historical reports independent of the historical audits, wherein the set of unsupervised model features is associated with training the model to process the report independent of the context of the historical audits; determining, by the device and utilizing the model, a score for the report after the model is trained using the set of supervised model features and the set of unsupervised model features, wherein the score indicates a likelihood of an issue related to the report; and performing, by the device, one or more actions based on the score.

According to some possible implementations, a device may comprise one or more memories; and one or more processors, communicatively coupled to the one or more memories, to: receive data that is related to training a model to identify an issue included in a report; determine a multi-entity profile for the data after receiving the data, wherein the multi-entity profile includes a set of groupings of the data by a set of attributes included in the data; determine, using the multi-entity profile, a set of supervised model features for historical reports based on historical audits, wherein the set of supervised model features is associated with training the model to process the report in a context of the historical audits; determine, using the multi-entity profile, a set of unsupervised model features for the historical reports independent of the historical audits, wherein the set of unsupervised model features is associated with training the model to process the report independent of the context of the historical audits; process, utilizing the model, the report to identify a score indicating whether the issue is included in the report after the model is trained using the set of supervised model features and the set of unsupervised model features; and flag the report as including the issue or not including the issue based on the score.

According to some possible implementations, a non-transitory computer-readable medium storing instructions, the instructions comprising: one or more instructions that, when executed by one or more processors, cause the one or more processors to: receive data that is to be used to train a model to identify an issue included in a report, wherein the data is related to: historical reports associated with an organization, historical audits of the historical reports, and individuals associated with the historical reports; determine a multi-entity profile for the data after receiving the data, wherein the multi-entity profile includes a set of groupings of the data by a set of attributes included in the data; determine, using the multi-entity profile, a set of supervised model features for the historical reports based on the historical audits, wherein the set of supervised model features is associated with training the model to process the report in a context of the historical audits; determine, using the multi-entity profile, a set of unsupervised model features for the historical reports independent of the historical audits, wherein the set of unsupervised model features is associated with training the model to process the report independent of the context of the historical audits; train the model based on the set of supervised model features and the set of unsupervised model features after determining the set of supervised model features and the set of unsupervised model features; determine, utilizing the model, a score for the report after training the model, wherein the score indicates a likelihood of the issue related to the report; and perform one or more actions based on the score.

BRIEF DESCRIPTION OF THE DRAWINGS

FIGS. 1A-1G are diagrams of an example implementation described herein.

DETAILED DESCRIPTION

Figure 1A:
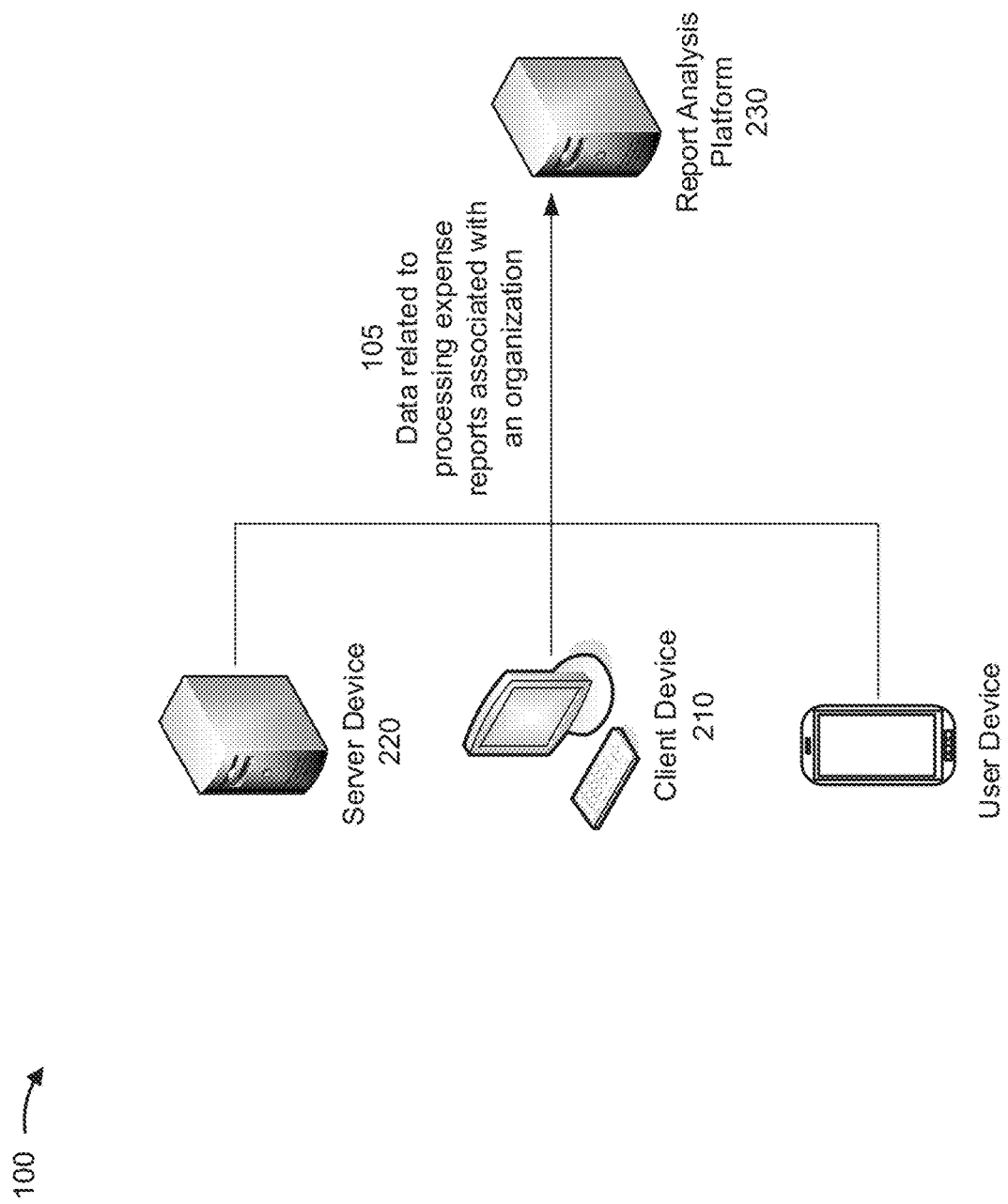

The following detailed description of example implementations refers to the accompanying drawings. The same reference numbers in different drawings may identify the same or similar elements.

An organization may generate various types of reports related to operations of the organization. The organization may want to audit reports to determine whether the reports generated by the organization include an issue (e.g., are fraudulent, are inaccurate, fail to conform to formatting rules, and/or the like). One technique for auditing the reports may include identifying a sample of the reports (e.g., a random sample, a sample based on a schedule, and/or the like) and auditing the sample of the reports. While this technique may identify some issues included in the reports, this technique may have a low accuracy for identifying issues in the reports and/or may be time consuming. In addition, as a quantity of reports generated by the organization increases, this technique may have difficulty scaling with the increase in the quantity. This can result in a significant majority (e.g., 90 percent or more) of the reports, generated by the organization during a time period, never being audited. This significantly reduces the organization's capability to identify and/or fix reports that include an issue, thereby consuming significant resources of the organization (e.g., monetary resources that are consumed based on issue-containing reports, time resources that are consumed using issue-containing reports, computing resources that are consumed processing issue-containing reports, and/or the like).

Some implementations described herein provide a report analysis platform that is capable of processing reports (e.g., thousands, millions, or more reports) associated with an organization utilizing a machine learning model and detecting issues in the reports. In this way, the report analysis platform can process a significant majority (e.g., 90 percent or more), or all, of the reports generated by the organization in a quick and efficient manner. This improves an accuracy of processing reports to identify an issue relative to other techniques. In addition, this increases a throughput of an organization's capability to process reports associated with the organization, thereby reducing or eliminating a risk of missed reports that include an issue. Further, this conserves resources of the organization (e.g., monetary resources, time resources, computing resources, and/or the like) that would otherwise be consumed as a result of using other techniques for processing reports.

Further, in this way, several different stages of the process for detecting an issue related to a report are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. Further, automating the process for detecting an issue related to a report conserves computing resources (e.g., processor resources, memory resources, and/or the like) of a device that would otherwise be wasted in attempting to use another technique to process a report generated by the organization and/or in using, processing, and/or the like an issue-containing reports.

FIGS. 1A-1G are diagrams of an example implementation 100 described herein. As shown in FIG. 1A, implementation 100 includes a server device 220, a client device 210, a user device, and a report analysis platform 230.

As shown by reference number 105, the report analysis platform 230 may receive data related to processing expense reports associated with an organization. For example, the data may be related to historical audits of expense reports (e.g., data that identifies audit outcomes of historical expense reports), historical expense reports, employees (or other individuals) associated with the organization (e.g., data that identifies a job title, a location, a tenure, and/or the like), exchange rates between various currencies, and/or the like. In some implementations, the report analysis platform 230 may receive the data from the server device 220, the client device 210, and/or the user device. In some implementations, the report analysis platform 230 may receive the data based on requesting the data, according to a schedule, periodically, and/or the like.

In some implementations, the report analysis platform 230 may receive the data in various forms. For example, the report analysis platform 230 may receive the data in the form of an image (e.g., an image of a receipt associated with an expense report, a historical audit in the form of an image, and/or the like), as text (e.g., text of a historical expense report input to an expense reporting system, text of a historical audit report, and/or the like), as application data from an application hosted on, executed on, and/or the like the server device 220, the client device 210, and/or the user device, as input to the report analysis platform 230 (e.g., via a user interface associated with the report analysis platform 230), as transactional data from the server device 220, the client device 210, the user device, and/or the like generated in association with completing a transaction associated with a historical expense report, and/or the like. In some implementations, when receiving the data, the report analysis platform 230 may receive thousands, millions, or more data elements for thousands, millions, or more historical audits, historical expense reports, employees (or other individuals), and/or the like. In this way, the report analysis platform 230 may receive a data set that cannot be processed manually or objectively by a human actor.

Figure 1B:
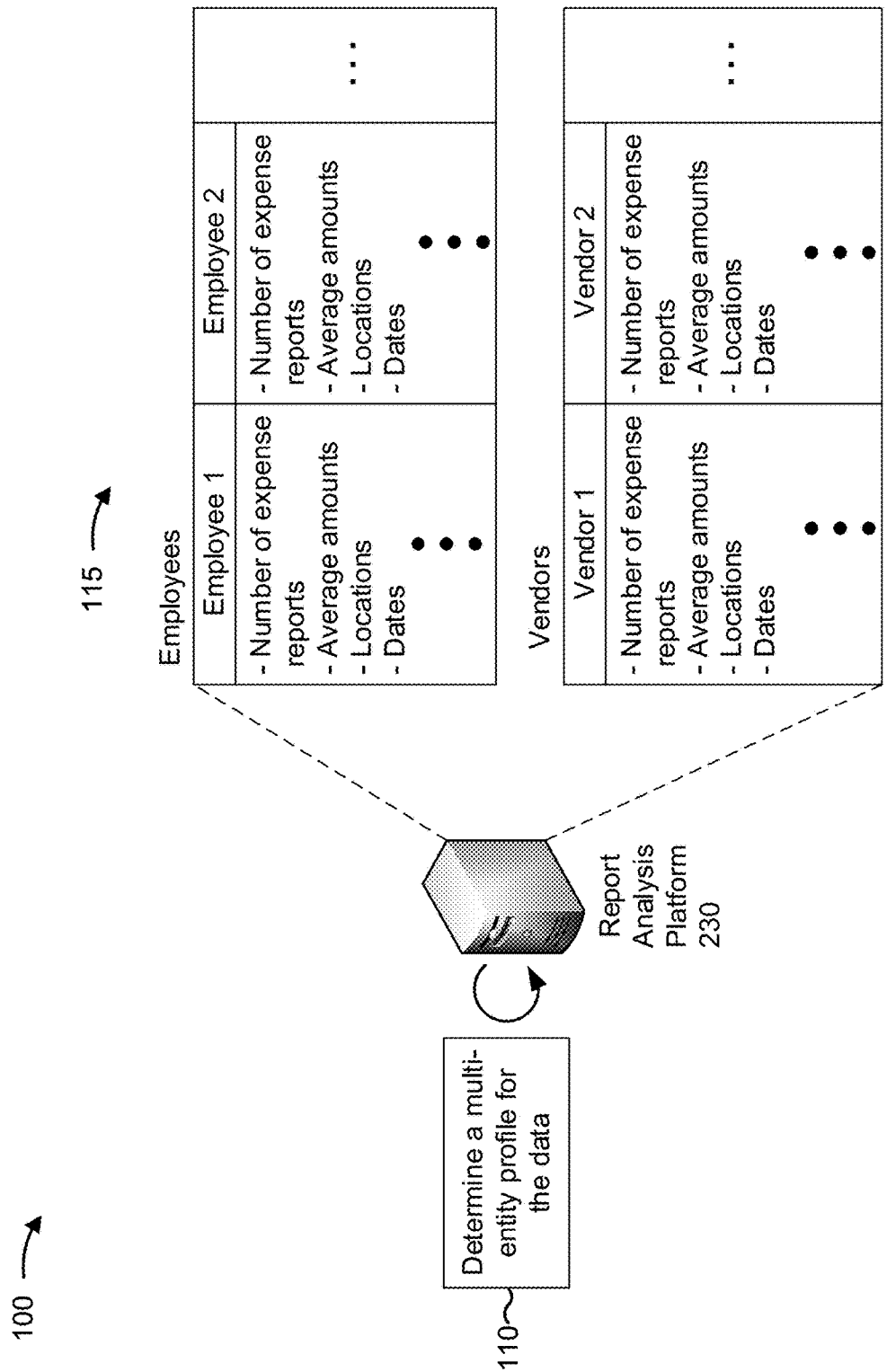

Turning to FIG. 1B, and as shown by reference number 110, the report analysis platform may determine a multi-entity profile for the data. For example, the report analysis platform may determine the multi-entity profile for the data after receiving the data. In some implementations, a multi-entity profile may include a set of groupings of the data by a set of attributes included in the data. For example, the multi-entity profile may organize data related to historical audits, historical expense reports, and/or the like by individual (e.g., an individual that submitted a historical expense report, an individual whose historical expense report was audited, and/or the like), a location (e.g., a location of an individual associated with a historical expense report, a location of expenses associated with a historical expense report, and/or the like), a vendor (e.g., associated with an expense associated with a historical expense report), and/or the like. Continuing with the previous example, a multi-entity profile for an individual may include data related to historical expense reports associated with an individual, historical audits of the historical expense reports, a location of the historical expense reports, vendors associated with the historical expense reports, and/or the like. Additionally, or alternatively, the report analysis platform may organize data by an amount associated with a report (e.g., an amount of an expense associated with a historical expense report, an amount of an error identified in an expense report, and/or the like).

In some implementations, the report analysis platform may organize the data for the multi-entity profile based on unique identifiers included in the data (e.g., unique identifiers that uniquely identify an individual associated with the data, a location associated with the data, a vendor associated with the data, and/or the like). In some implementations, the unique identifiers may be included in the data as an attribute of the data (e.g., as a field with a unique value, such as a name, an identification number, and/or the like), and the report analysis platform may organize the data based on the unique identifiers included as the attribute in the data.

Additionally, or alternatively, the report analysis platform may process the data to identify the unique identifiers. For example, the report analysis platform may process images using an image processing technique, such as a computer vision technique, a feature detection technique, an optical character recognition (OCR) technique, and/or the like to identify an alphanumeric string, a symbol, a code (e.g., a barcode, a matrix barcode, and/or the like) in the image (e.g., that identify the presence of a unique identifier, that are a unique identifier, and/or the like). Continuing with the previous example, the report analysis platform may compare the alphanumeric string, the symbol, the code, and/or the like to information stored in a data structure and/or in memory resources of the report analysis platform to determine which unique identifiers are included in the image.

Additionally, or alternatively, and as another example, the report analysis platform may process the data using a text processing technique, such as a natural language processing technique, a text analysis technique, and/or the like. Continuing with the previous example, the report analysis platform may process the text to identify an alphanumeric string, a symbol, a code, and/or the like included in the data (e.g., that indicate a presence of a unique identifier, that are a unique identifier, and/or the like), and may identify the unique identifiers included in the text in a manner similar to that described above.

Additionally, or alternatively, and as another example, the report analysis platform may process the data using a model (e.g., a machine learning model, an artificial intelligence model, and/or the like) to identify a unique identifier included in the data. For example, the report analysis platform may use the model to process an image and/or text to identify an alphanumeric string, a symbol, a code, and/or the like included in the data, to identify an area of the data (e.g., an area of an image and/or text) that likely includes a unique identifier, and/or the like (e.g., based on having been trained to identify unique identifiers in the data, a likely area in the data that may include a unique identifier, and/or the like). In some implementations, the model and/or training of the model may be similar to that described elsewhere herein.

Reference number 115 shows example multi-entity profiles that the report analysis platform may generate. As shown, a multi-entity profile may organize the data that the report analysis platform received by employee, by vendor, and/or the like. In this way, a multi-entity profile facilitates quick and easy access to data in an organized manner. This conserves processing resources of the report analysis platform relative to not using a multi-entity profile, facilitates training of a model to identify issues in a report based on attributes included in the data (e.g., the report analysis platform may train the model on a particular employee or employees generally, on a particular vendor or vendors generally, and/or the like), thereby improving an accuracy of the model with regard to identifying issues in reports.

Figure 1C:
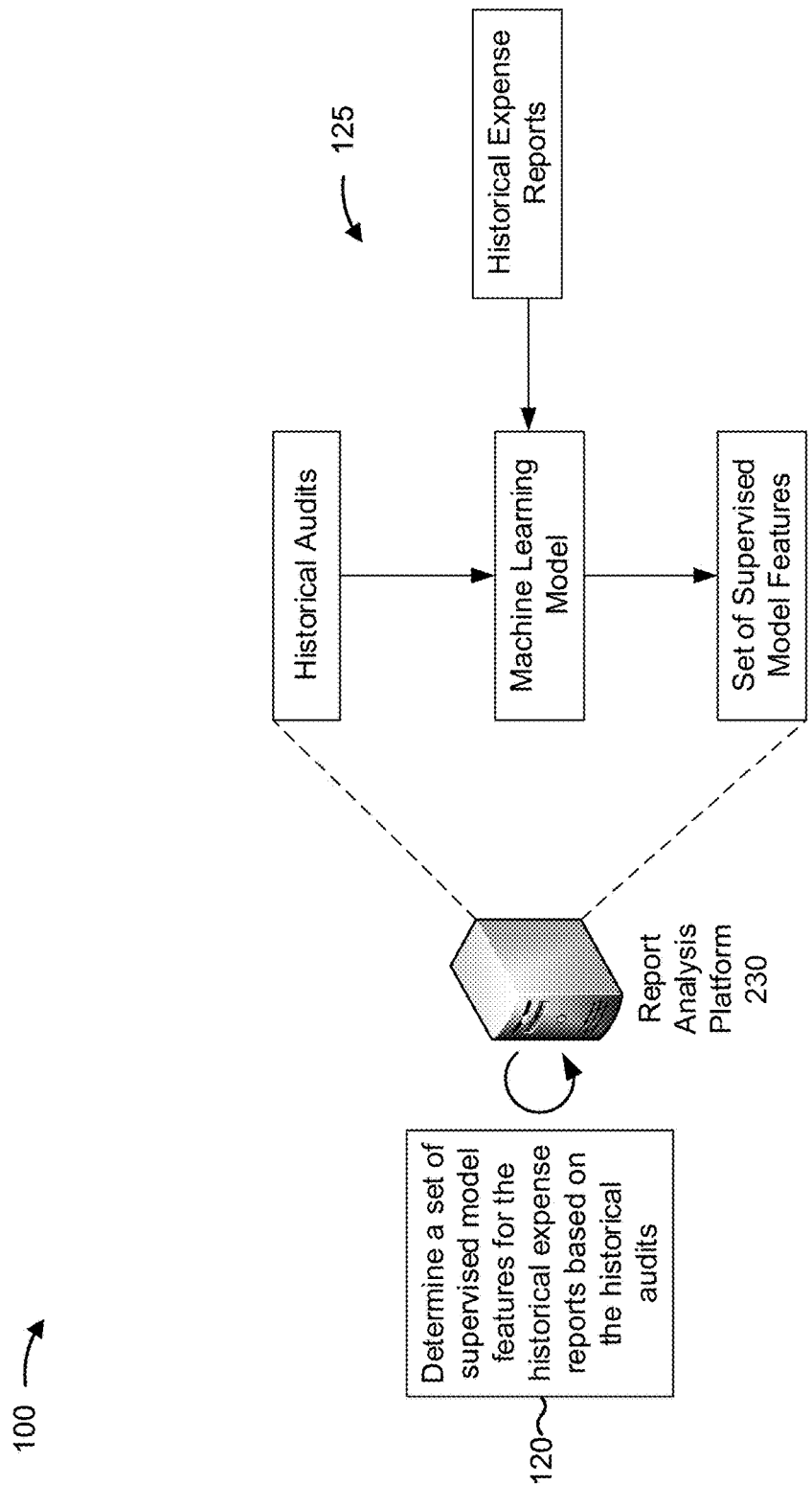

Turning to FIG. 1C, and as shown by reference number 120, the report analysis platform may determine a set of supervised model features for the historical expense reports based on the historical audits. For example, the report analysis platform may determine the set of supervised model features after determining the multi-entity profile. In some implementations, a supervised model feature may include a feature of the data that can be used to train a model, to identify an issue in a report, and/or the like. For example, a supervised model feature may include a pattern of expenses for an employee, a location, a vendor, and/or the like (e.g., an amount of the expenses, dates of the expenses, locations of the expenses, and/or the like). In some implementations, the set of supervised model features may be associated with training a model to process a report in a context of the historical audits. For example, the report analysis platform may determine which features of the data may indicate an issue included in a report based on a result of the historical audits. Continuing with the previous example, the report analysis platform may determine which features of the data indicate that a report includes an issue which would likely cause the report to fail an audit, which features of the data indicate that a report would likely pass an audit, and/or the like.

As shown by reference number 125, the report analysis platform may input data related to historical audits and the historical expense reports into a machine learning model to determine the set of supervised model features. For example, the report analysis platform may input the data related to the historical audits and to the historical expense reports, and the machine learning model may output the set of supervised model features (e.g., based on the training of the machine learning model).

In some implementations, when processing the data related to the historical audits and the historical expense reports, the machine learning model may group the historical expense reports by outcome of the historical audits. For example, the machine learning model may group, utilizing the data related to the historical audits, the data related to the historical expense reports into groups, such as historical expense reports that failed a historical audit, that passed a historical audit, that failed or passed an initial historical audit but the outcome was subsequently reversed, that were not audited, and/or the like.

In some implementations, the report analysis platform may use the multi-entity profile for the data as the input to the machine learning model. This facilitates identification of the set of supervised model features for different attributes included in the data, which can make the supervised model features more dynamic, can improve an accuracy of the set of supervised model features, and/or the like.

In some implementations, prior to inputting the data related to the historical audits and/or the historical expense reports, the report analysis platform may prepare and/or pre-process the data. For example, the report analysis platform may identify keywords included in the data, such as unique identifiers that are common to both the data related to the historical audits and to the data related to the historical expense reports, terms that identify historical audits that resulted in a pass, terms that identify historical audits that resulted in a fail, amounts associated with a historical expense report, locations of the historical expense reports, and/or the like. Additionally, or alternatively, the report analysis platform may remove leading and/or trailing spaces from text included in the data related to the historical audits and the historical expense reports, may remove non-American Standard Code for Information Interchange (ASCII) characters, and/or the like. This facilitates quick and/or easy processing of the data related to the historical audits and the historical expense reports by making the data more uniform, thereby facilitating fast determination of the supervised model features, more accurate determinization of the supervised model features, and/or the like.

In some implementations, the report analysis platform may generate the machine learning model. For example, the report analysis platform may have trained the machine learning model to identify the set of supervised model features from the data related to the historical audits and the historical expense reports.

In some implementations, the report analysis platform may have trained the machine learning model on a training set of data. For example, the training set of data may include data related to historical audits and historical expense reports and data that identifies supervised model features from the data related to the historical audits and the historical expense reports. Additionally, or alternatively, when the report analysis platform inputs the data related to the historical audits and the historical expense reports into the machine learning model, the report analysis platform may input a first portion of the data as a training set of data, a second portion of the data as a validation set of data, and third portion of the data as a test set of data (e.g., to be used to determine the set of supervised model features). In some implementations, the report analysis platform may perform multiple iterations of training of the machine learning model, depending on an outcome of testing of the machine learning model (e.g., by submitting different portions of the data as the training set of data, the validation set of data, and the test set of data).

In some implementations, when generating the machine learning model, the report analysis platform may utilize a random forest classifier technique to generate the machine learning model. For example, the report analysis platform may utilize a random forest classifier technique to construct multiple decision trees during training and may output a classification of data. Additionally, or alternatively, when generating the machine learning model, the report analysis platform may utilize a gradient boost tree classifier technique to generate the machine learning model. For example, the report analysis platform may utilize a gradient boost tree classifier technique to generate a prediction model from a set of weak prediction models (e.g., by generating the machine learning model in a stage-wise manner, by optimizing an arbitrary differentiable loss function, and/or the like).

In some implementations, when generating the machine learning model, the report analysis platform may utilize logistic regression to generate the machine learning model. For example, the report analysis platform may utilize a binary classification of the data related to the historical audits and the historical expense reports (e.g., a pass classification or a fail classification) to train the machine learning model to identify the set of supervised model features based on the classification of the data. Additionally, or alternatively, when generating the machine learning model, the report analysis platform may utilize a Naive Bayes classifier to train the machine learning model. For example, the report analysis platform may utilize binary recursive partitioning to divide the data related to the historical audits and the historical expense reports into various binary categories (e.g., starting with a pass or fail binary category for a historical audit). Based on using recursive partitioning, the report analysis platform may reduce utilization of computing resources relative to manual, linear sorting and analysis of data points, thereby enabling use of thousands, millions, or billions of data points to train a machine learning model, which may result in a more accurate machine learning model than using fewer data points.

Additionally, or alternatively, when generating the machine learning model, the report analysis platform may utilize a support vector machine (SVM) classifier. For example, the report analysis platform may utilize a linear model to implement non-linear class boundaries, such as via a max margin hyperplane. Additionally, or alternatively, when utilizing the SVM classifier, the report analysis platform may utilize a binary classifier to perform a multi-class classification. Use of an SVM classifier may reduce or eliminate overfitting, may increase a robustness of the machine learning model to noise, and/or the like.

In some implementations, the report analysis platform may train the machine learning model of supervised model features using a supervised training procedure that includes receiving input to the machine learning model from a subject matter expert. In some implementations, the report analysis platform may use one or more other model training techniques, such as a neural network technique, a latent semantic indexing technique, and/or the like. For example, the report analysis platform may perform an artificial neural network processing technique (e.g., using a two-layer feedforward neural network architecture, a three-layer feedforward neural network architecture, and/or the like) to perform pattern recognition with regard to patterns of supervised model features, patterns of supervised model features based on an outcome of a historical audit, and/or the like. In this case, using the artificial neural network processing technique may improve an accuracy of a model generated by the report analysis platform by being more robust to noisy, imprecise, or incomplete data, and by enabling the report analysis platform to detect patterns and/or trends undetectable to human analysts or systems using less complex techniques.

As an example, the report analysis platform may use a supervised multi-label classification technique to train the machine learning model. For example, as a first step, the report analysis platform may map data associated with the historical expense reports to a set of previously generated supervised model features after labeling the historical expense reports. In this case, the historical expense reports may be characterized as having passed a historical audit, having failed a historical audit, as including an issue, as not including an issue, and/or the like (e.g., by a technician, thereby reducing processing relative to the report analysis platform being required to analyze each historical expense report and/or historical audit). As a second step, the report analysis platform may determine classifier chains, whereby labels of target variables may be correlated (e.g., in this example, labels may be a result of a historical audit and correlation may refer to supervised model features common to the different labels, and/or the like). In this case, report analysis platform 230 may use an output of a first label as an input for a second label (as well as one or more input features, which may be other data relating to the historical expense reports and/or the historical audits), and may determine a likelihood that a particular historical expense report includes an issue and/or is associated with a set of supervised model features based on a similarity to other historical expense reports that include similar data. In this way, the report analysis platform transforms classification from a multilabel-classification problem to multiple single-classification problems, thereby reducing processing utilization. As a third step, the report analysis platform may determine a Hamming Loss Metric relating to an accuracy of a label in performing a classification by using the validation set of the data (e.g., an accuracy with which a weighting is applied to each historical report and whether each historical report includes an issue and/or a set of supervised model features, results in a correct prediction of whether a historical expense report includes an issue and/or a set of supervised model features, and/or the like, thereby accounting for variations among historical expense reports). As a fourth step, the report analysis platform may finalize the machine learning model based on labels that satisfy a threshold accuracy associated with the Hamming Loss Metric, and may use the machine learning model for subsequent prediction of whether an expense report includes an issue, includes a set of supervised model features, would pass or fail an audit, and/or the like.

Figure 1D:
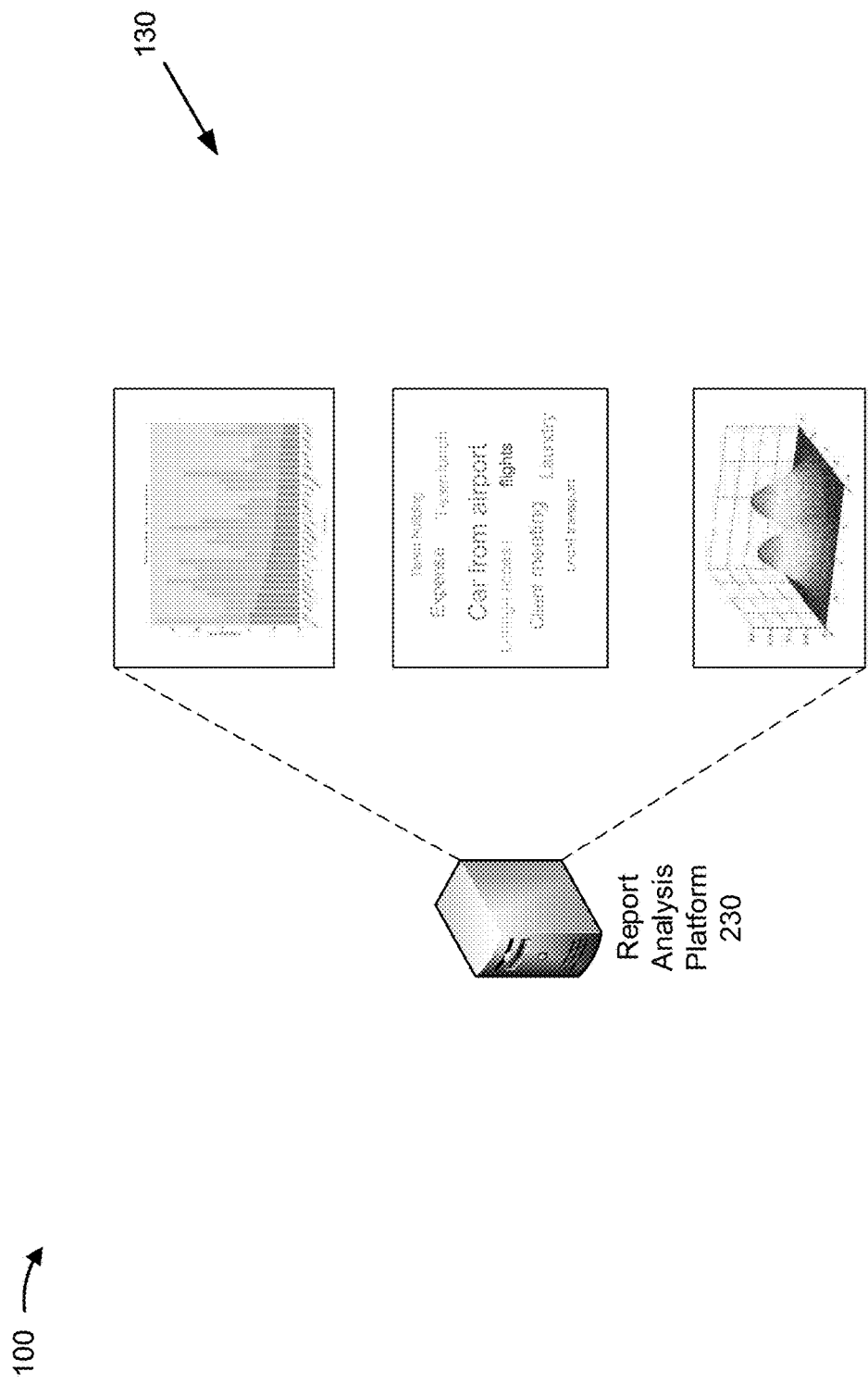

Turning to FIG. 1D, and as shown by reference number 130, the report analysis platform may perform various analyses and/or may generate various reports, charts, and/or the like based on the set of supervised model features and/or may determine the set of supervised model features based on performing the various analyses and/or generating the various reports, charts, and/or the like. For example, the report analysis platform may identify a risk for an expense report (e.g., a likelihood that an expense report includes an issue) based on a location of the expense report, a vendor associated with the expense report, and/or the like as a result of the set of model features output by the machine learning model.

Continuing with the previous example, the set of model features may indicate that historical expense reports from a particular country are associated with a high likelihood of failing a historical audit, as including an issue, and/or the like. Additionally, or alternatively, and as another example, the report analysis platform may determine a pattern of compliant and non-compliant historical expense reports by attribute included in the data associated with the historical expense reports. Continuing with the previous example, the report analysis platform may determine that a first pattern of data related to historical expense reports (e.g., a pattern of amounts, locations, dates, and/or the like) for an individual are associated with a low likelihood of including an issue, may determine that a second pattern of data related to historical expense reports for the individual are associated with a high likelihood of including an issue (e.g., a pattern that deviates from the first pattern), and/or the like.

Additionally, or alternatively, and as another example, the report analysis platform may perform a linear discriminate analysis of the historical expense reports, the historical audits, the set of supervised model features, and/or the like. For example, the report analysis platform may determine particular supervised model features that are associated with historical expense reports that pass an audit, that fail an audit, that include an issue, that do not include an issue, that match a pattern of previous compliant or non-compliant historical expense reports, and/or the like. Additionally, or alternatively, and as another example, the report analysis platform may perform a text analysis of the historical expense reports, the historical audits, and/or the set of supervised model features (e.g., of information that identifies the set of supervised model features) to identify terms, phrases, patterns of terms and/or phrases, and/or the like that are common to historical expense reports that passed a historical audit, that failed a historical audit, that include an issue, the do not include an issue, and/or the like.

Figure 1E:
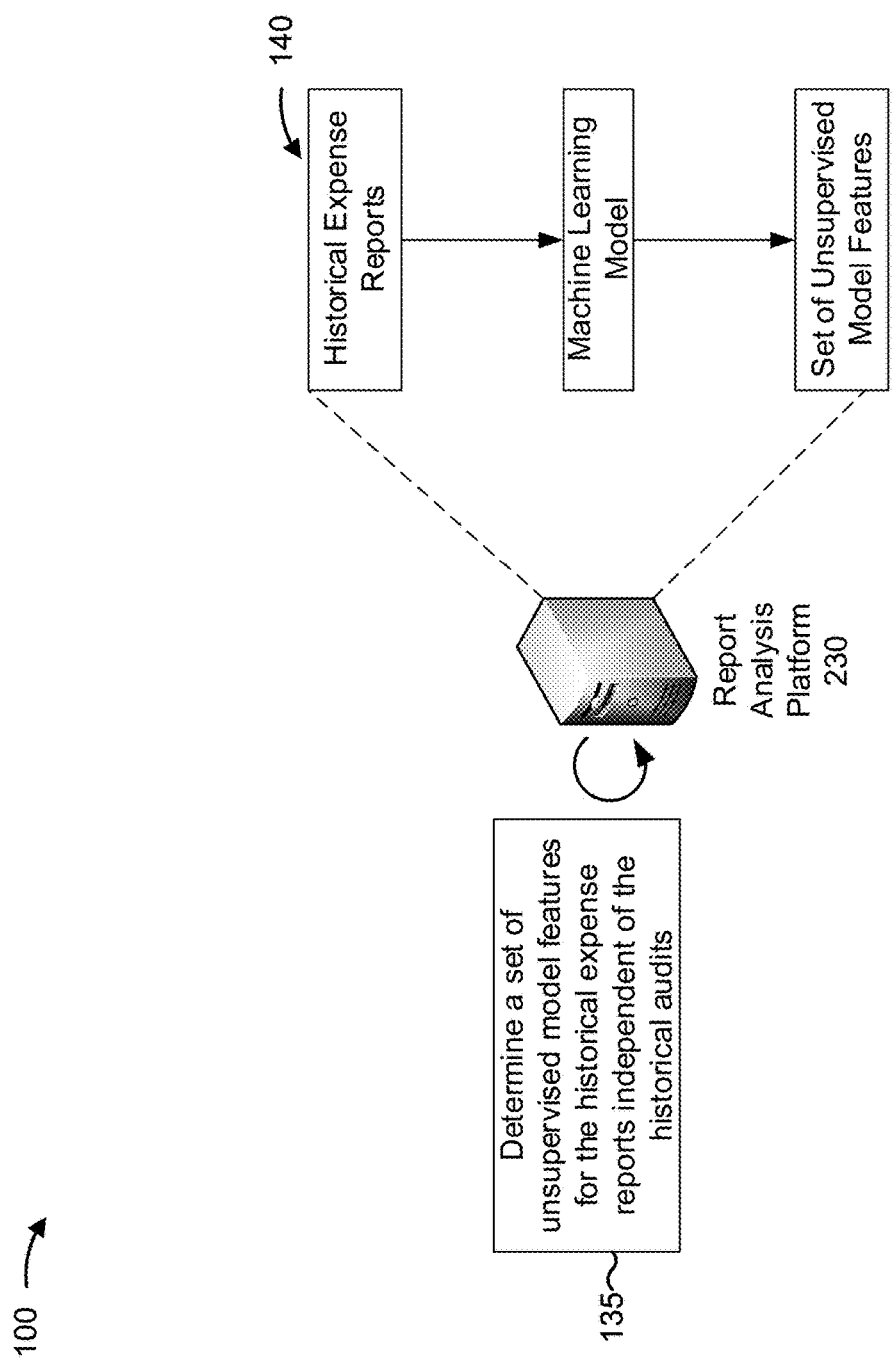

Turning to FIG. 1E, as shown by reference number 135, the report analysis platform may determine a set of unsupervised model features for the historical expense reports independent of the historical audits. For example, the report analysis platform may determine the set of unsupervised model features in a manner that is the same as or similar to that described elsewhere herein with regard to the set of supervised model features. In some implementations, the set of of unsupervised model features may include patterns of data related to historical expense reports without the context of the historical audits (e.g., without categorization of the historical expense reports into historical expense reports that have passed a historical audit or that have failed a historical audit). In some implementations, the set of unsupervised model features may be associated with training a model independent of the context of the historical audits. In some implementations, unsupervised model features may be independent of historical audits and, as a result, may identify new, unusual, and/or abnormal behavior and/or patterns in the historical reports, which were missed by the historical audits.

As shown by reference number 140, the report analysis platform may determine the set of unsupervised model features by processing data related to historical expense reports using a machine learning model. In some implementations, the machine learning model may be similar to that described elsewhere herein. For example, the machine learning model may output a set of unsupervised model features determined from the data related to the historical expense reports. In some implementations, the report analysis platform may input the multi-entity profile for the data related to the historical expense reports to the machine learning model to determine the set of unsupervised model features, in a manner that is the same as or similar to that described elsewhere herein with regard to the set of supervised model features.

Turning to FIG. 1F, and as shown by reference number 145, the report analysis platform may perform various analyses and/or may generate various reports, charts, and/or the like based on the set of unsupervised model features and/or may determine the set of unsupervised model features based on performing the various analyses and/or generating the various reports, charts, and/or the like. For example, the report analysis platform may perform an intra-individual analysis of the unsupervised model features. Continuing with the previous example, the report analysis platform may identify a pattern of unsupervised model features for a particular individual. This facilitates analysis of a new expense report for an individual in the context of the individual's historical expense reports, thereby improving performance of the report analysis platform with regard to identifying issues included in expense reports.

Additionally, or alternatively, and as another example, the report analysis platform may perform an inter-individual analysis of the set of unsupervised model features. Continuing with the previous example, the report analysis platform may identify a pattern of unsupervised model features across multiple individuals (e.g., associated with a same location, that submitted historical expense reports during a time period, associated with a same type of expense, and/or the like). This facilitates analysis of a new expense report for an individual in the context of the individual's peer group, thereby improving performance of the report analysis platform with regard to identifying issues included in expense reports.

Additionally, or alternatively, the report analysis platform may perform a kernel density estimation (KDE) anomaly detection analysis of the historical expense reports, the set of unsupervised model features, and/or the like. For example, the report analysis platform may perform the KDE anomaly detection analysis to detect anomalies in the historical expense reports (e.g., anomalous locations, amounts, and/or the like).

Figure 1G:
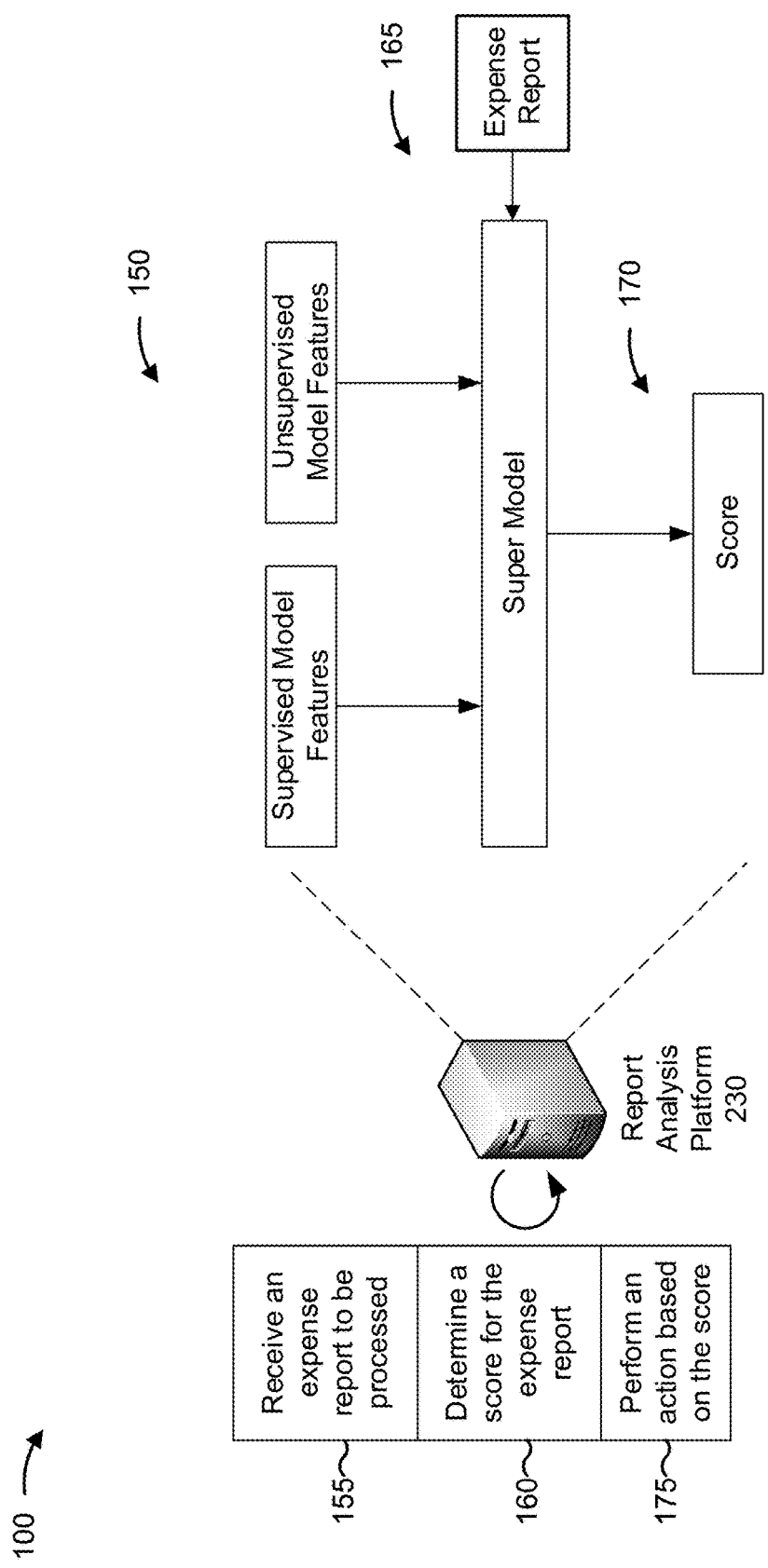

Turning to FIG. 1G, and as shown by reference number 150, the report analysis platform may combine the set of supervised model features and the set of unsupervised model features into a super model. For example, the report analysis platform may combine the set of supervised model features and the set of unsupervised model features into the super model after determining the set of supervised model features and the set of unsupervised model features. In some implementations, the report analysis platform may generate the super model by training a machine learning model on the set of supervised model features and the set of unsupervised model features. In some implementations, the report analysis platform may train the machine learning model using the super model. For example, the machine learning model may be similar to that described elsewhere herein.

In some implementations, the super model may include a gradient boosting tree. For example, the report analysis platform may combine the set of supervised model features and the set of unsupervised model features into a gradient boosting tree that can be used to determine a score for a report (e.g., by combining patterns extracted from the data into a single model).

As shown by reference number 155, the report analysis platform may receive an expense report to be processed. For example, the report analysis platform may receive the expense report after generating the super model and/or utilizing the super model to train a machine learning model. In some implementations, the expense report may include data that identifies a set of expenses associated with the expense report, an individual that submitted the expense report, a set of individuals that incurred the expenses, an amount of the expenses, a location of the expenses, a type of the expenses (e.g., food, fuel, lodging, and/or the like), a vendor associated with the expenses, and/or the like. In some implementations, the expense report may be similar to a historical expense report described elsewhere herein.

In some implementations, the report analysis platform 230 may receive the expense report from the server device 220, the client device 210, the user device, and/or the like. In some implementations, the report analysis platform 230 may receive the expense report when the expense report is generated, may receive a batch of expense reports at a particular time or after a threshold quantity of expense reports have been submitted, and/or the like. In some implementations, the report analysis platform 230 may receive thousands, millions, or more expense reports associated with thousands, millions, or more individuals, vendors, locations, and/or the like. In this way, the report analysis platform 230 may receive a quantity of expense reports that cannot be processed manually or objectively (e.g., in a consistent manner) by a human actor.

As shown by reference number 160, the report analysis platform may determine a score for the expense report. For example, the report analysis platform may determine the score after receiving the expense report. In some implementations, the score may indicate a likelihood of the expense report including an issue. For example, the score may indicate a likelihood of the expense report including a fraudulent expense, a likelihood of the expense report failing an audit, a likelihood of the expense report including data that does not match the features of the super model, and/or the like.

As shown by reference number 165, the report analysis platform may input the expense report (or data extracted from the expense report using a text processing technique, an image processing technique, and/or the like similar to that described elsewhere herein) into the super model. For example, the report analysis platform may input the expense report in association with determining to determine the score for the expense report. In some implementations, the report analysis platform may use the super model to process the expense report (e.g., data from the expense report) to determine whether the expense report matches the set of supervised model features, the set of unsupervised model features, and/or the like. Continuing with the previous example, the report analysis platform may determine whether a combination of location, amount, individual, and/or the like associated with the expense report matches a pattern of supervised model features and/or unsupervised model features included in the super model.

In some implementations, the super model may be machine learning model that has been trained on a set of supervised model features and/or a set of unsupervised model features. For example, the super model may be trained to process the expense report after having been trained. Continuing with the previous example, the super model may be similar to other machine learning models described elsewhere herein and/or may be trained to output a score (e.g., based on data associated with the expense report).

As shown by reference number 170, the super model may output the score after the report analysis platform has processed the expense report using the super model. Additionally, or alternatively, when the report analysis platform processes the expense report using a machine learning model, the machine learning model may output the score. In some implementations, the score may be an average score, a range of scores, and/or the like. For example, the report analysis platform may perform multiple iterations of processing the expense report and may generate the score based on the scores associated with the multiple iterations.

As shown by reference number 175, the report analysis platform 230 may perform an action based on the score. For example, the report analysis platform 230 may perform an action after determining the score for the expense report. In some implementations, the report analysis platform 230 may trigger an alarm based on the score (e.g., based on whether the score satisfies a threshold). Additionally, or alternatively, the report analysis platform 230 may send a message to the client device 210, the user device, and/or the server device 220 when the score satisfies a threshold (e.g., that includes information that identifies the expense report, the score, and/or the like). Additionally, or alternatively, the report analysis platform 230 may generate a report that identifies a result of processing a batch of expense reports (e.g., that includes information that identifies scores for each of the reports, whether the scores satisfy a threshold, a trend of the scores over time, and/or the like), and may store the report in the server device 220 and/or may output the report via the client device 210 and/or the user device. Additionally, or alternatively, the report analysis platform 230 may store the expense report in the server device 220 based on the score (e.g., based on whether the score satisfies a threshold), and may populate a user interface with information that identifies the expense report, with a link (e.g., a file path, a uniform resource locator (URL), a clickable icon, and/or the like) to a storage location of the expense report, and/or the like.

Additionally, or alternatively, the report analysis platform 230 may update one or more of the models described herein. Additionally, or alternatively, the report analysis platform 230 may trigger an automated investigation of an expense report (e.g., may trigger a more rigorous analysis of the expense report, such as by requesting input of an explanation of a discrepancy, requesting upload of an itemized receipt, requesting transaction records from a vendor's server device 220, and/or the like). Additionally, or alternatively, the report analysis platform 230 may trigger a manual investigation of the expense report (e.g., by sending a message to a user device associated with an investigator). Additionally, or alternatively, the report analysis platform 230 may freeze a credit card, an account, and/or the like. Additionally, or alternatively, the report analysis platform 230 may remove, add, or modify a requirement to an expense and/or expense report approval process, such as a requirement related to an individual that needs to authorize an expense and/or expense report, a timing of that authorization (e.g., before or after that expense and/or expense report), what needs to be pre-authorized, and/or the like.

Additionally, or alternatively, the report analysis platform may flag the expense report based on the score. For example, the report analysis platform may flag the expense report as possibly including an error and/or for further review based on the score satisfying a threshold. Additionally, or alternatively, the report analysis platform may flag attributes associated with the expense report when the score satisfies a threshold. For example, the report analysis platform may flag an individual, a location, a vendor, and/or the like associated with the expense report when the score satisfies a threshold. In some implementations, and continuing with the previous example, the report analysis platform may process old expense reports associated with the flagged attributes, may process any new expense reports associated with the flagged attributes, and/or the like.

In this way, the report analysis platform is capable of quickly and efficiently processing thousands, millions, or more expense reports generated by an organization in real-time or near real-time. This reduces an amount of time needed to process expense reports associated with the organization, thereby improving an efficiency of processing the expense reports. In addition, this increases a throughput of the organization's capability to process expense reports, thereby reducing or eliminating a risk of a missed expense report that includes an issue. Further, this provides an objective and verifiable tool that can be used to process expense reports, thereby providing the organization with a new way of processing expense reports and/or reducing or eliminating waste associated with a subjective analysis of expense reports.

As indicated above, FIGS. 1A-1G are provided merely as an example. Other examples are possible and may differ from what was described with regard to FIGS. 1A-1G. Although implementation 100 was described in the context of processing expense reports, the implementations apply equally to other types of reports, such as time entry reports, quality control reports, revenue reports, and/or the like.

Figure 2:
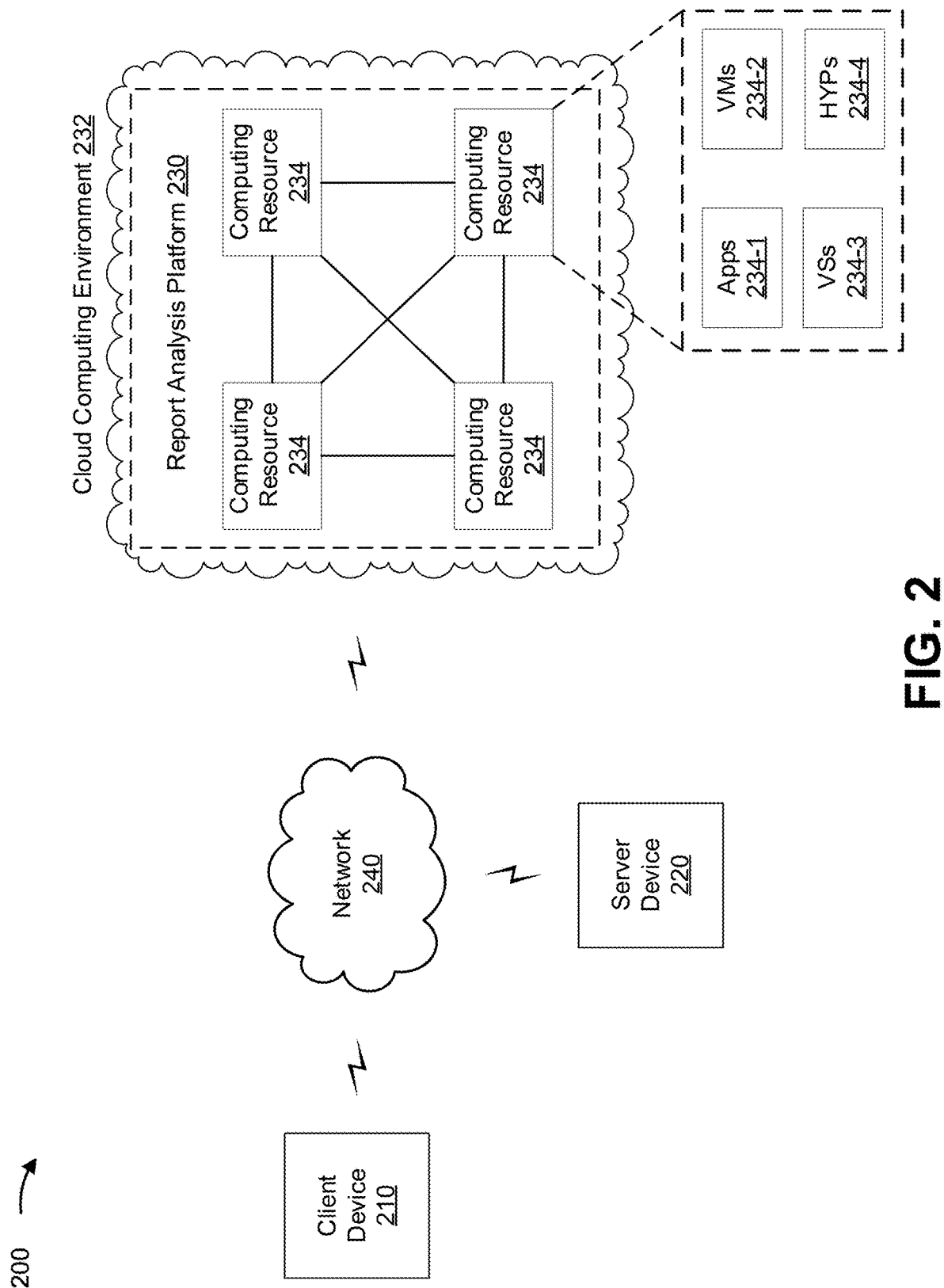
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, a report analysis platform 230 hosted within a cloud computing environment 232 that includes a set of computing resources 234, and a network 240. Devices of environment 200 may interconnect via wired connections, wireless connections, or a combination of wired and wireless connections.

Client device 210 includes one or more devices capable of receiving, generating, storing, processing, and/or providing information associated with a report. For example, client device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 210 may provide, to report analysis platform 230, a report to be processed by report analysis platform 230, as described elsewhere herein. In some implementations, a user device, as described elsewhere herein, may be the same as or similar to client device 210.

Server device 220 includes one or more devices capable of receiving, generating storing, processing, and/or providing information associated with a report. For example, server device 220 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 220 may include a communication interface that allows server device 220 to receive information from and/or transmit information to other devices in environment 200. In some implementations, server device 220 may be a physical device implemented within a housing, such as a chassis. In some implementations, server device 220 may be a virtual device implemented by one or more computer devices of a cloud computing environment or a data center. In some implementations, server device 220 may provide, to report analysis platform 230, a report to be processed by report analysis platform 230, as described elsewhere herein.

Report analysis platform 230 includes one or more devices capable of receiving, generating, storing, processing, and/or providing information related to reports. For example, report analysis platform 230 may include a cloud server or a group of cloud servers. In some implementations, report analysis platform 230 may be designed to be modular such that certain software components can be swapped in or out depending on a particular need. As such, report analysis platform 230 may be easily and/or quickly reconfigured for different uses.

In some implementations, as shown in FIG. 2, report analysis platform 230 may be hosted in cloud computing environment 232. Notably, while implementations described herein describe report analysis platform 230 as being hosted in cloud computing environment 232, in some implementations, report analysis platform 230 may not be cloud-based (i.e., may be implemented outside of a cloud computing environment) or may be partially cloud-based.

Cloud computing environment 232 includes an environment that hosts report analysis platform 230. Cloud computing environment 232 may provide computation, software, data access, storage, and/or other services that do not require end-user knowledge of a physical location and configuration of a system and/or a device that hosts report analysis platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host report analysis platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with report analysis platform 230 and/or any other software capable of being provided via cloud computing environment 232. In some implementations, one application 234-1 may send/receive information to/from one or more other applications 234-1, via virtual machine 234-2. In some implementations, application 234-1 may include a software application associated with one or more databases and/or operating systems. For example, application 234-1 may include an enterprise application, a functional application, an analytics application, and/or the like.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
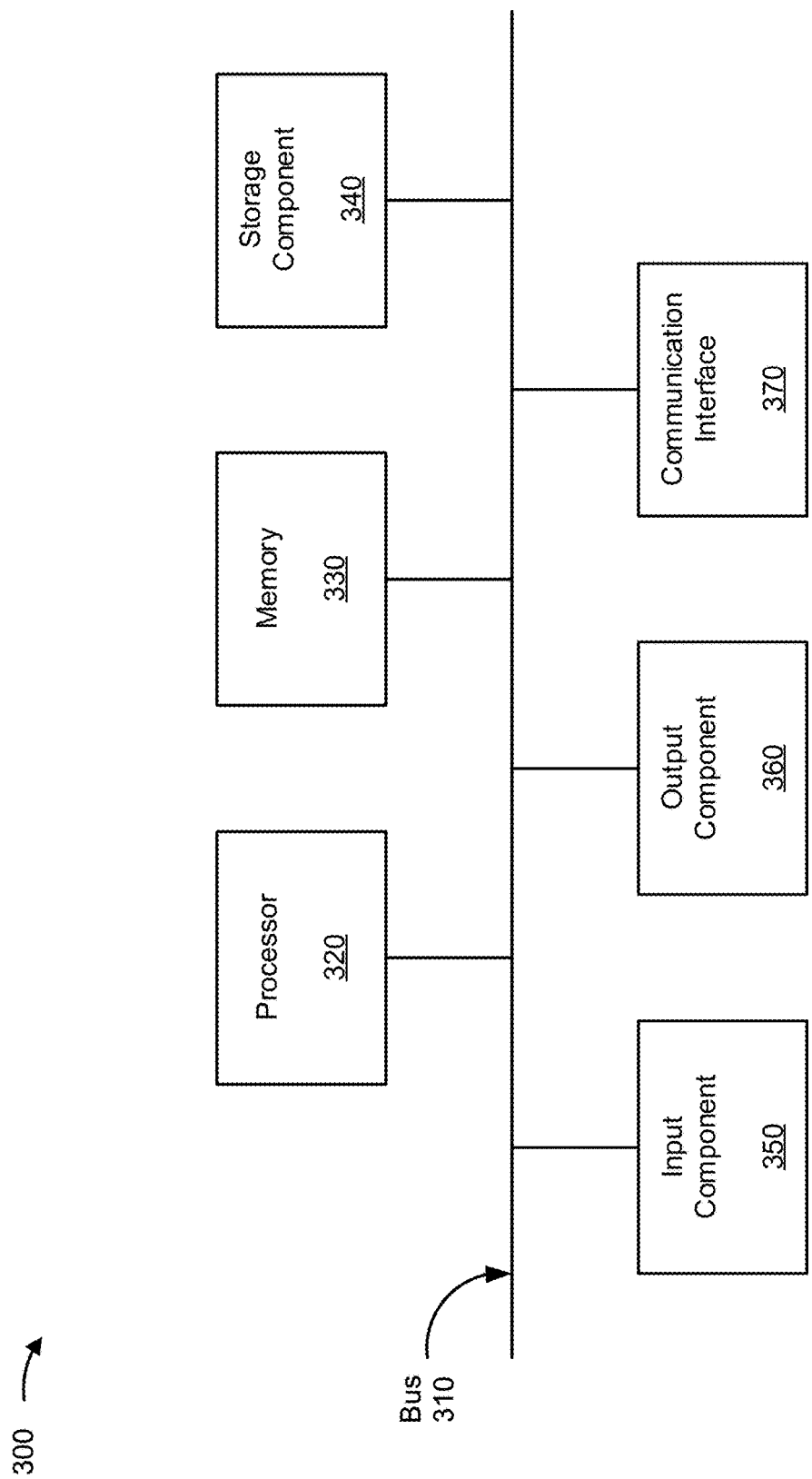
FIG. 3 is a diagram of example components of one or more devices of FIG. 2.

FIG. 3 is a diagram of example components of a device 300. Device 300 may correspond to client device 210, server device 220, report analysis platform 230, and/or computing resource 234. In some implementations, client device 210, server device 220, report analysis platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
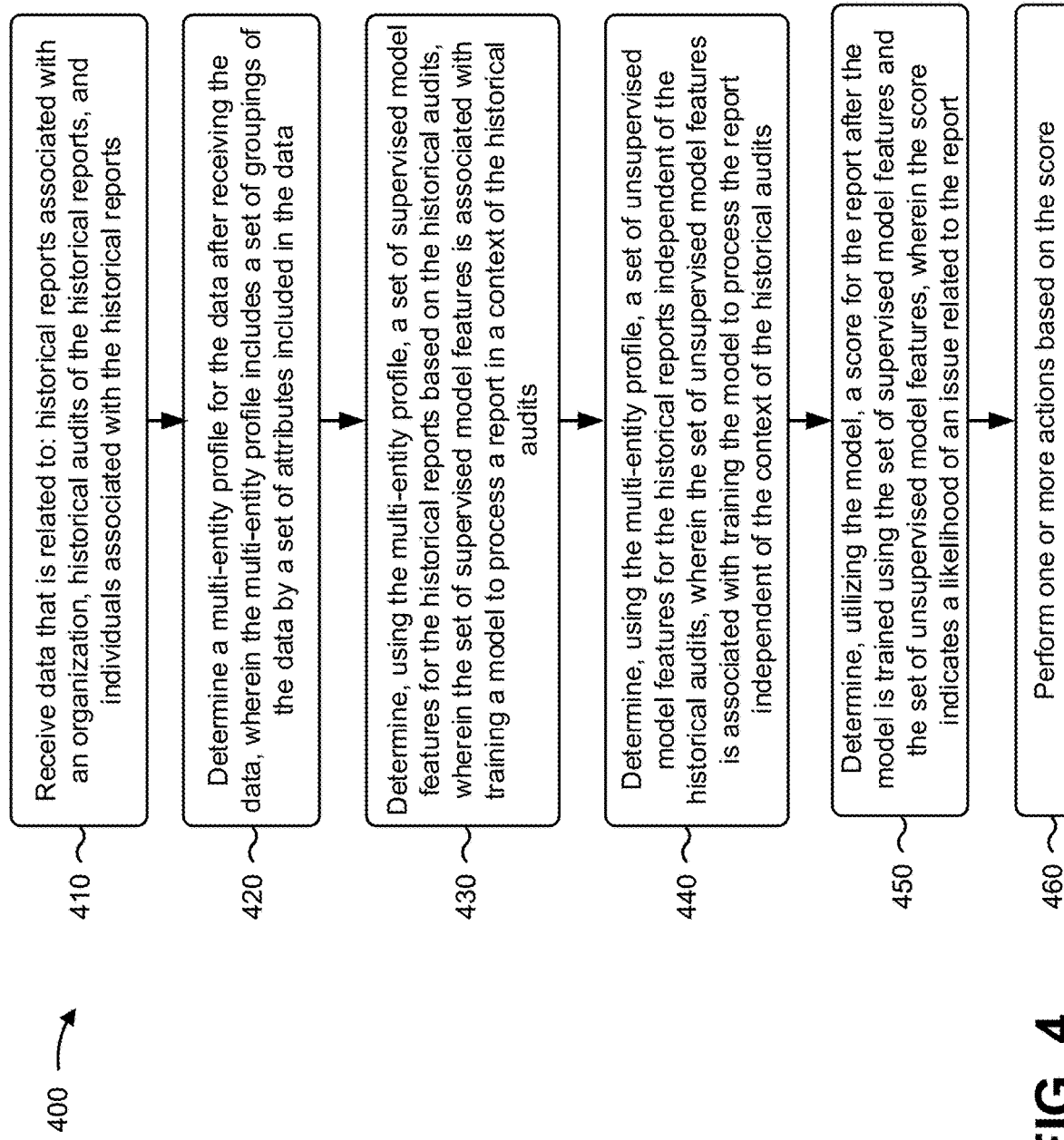
FIG. 4 is a flow chart of an example process for detecting an issue related to a report.

FIG. 4 is a flow chart of an example process 400 for detecting an issue related to a report. In some implementations, one or more process blocks of FIG. 4 may be performed by a report analysis platform (e.g., report analysis platform 230). In some implementations, one or more process blocks of FIG. 4 may be performed by another device or a group of devices separate from or including the report analysis platform, such as a client device (e.g., client device 210), a server device (e.g., server device 220), and a computing resource (e.g., computing resource 234).

As shown in FIG. 4, process 400 may include receiving data that is related to: historical reports associated with an organization, historical audits of the historical reports, and individuals associated with the historical reports (block 410). For example, the report analysis platform (e.g., report analysis platform 230 using computing resource 234, processor 320, input component 350, communication interface 370, and/or the like) may receive data that is related to: historical reports associated with an organization, historical audits of the historical reports, and individuals associated with the historical reports, in a manner that is the same as or similar to that described elsewhere herein.

As further shown in FIG. 4, process 400 may include determining a multi-entity profile for the data after receiving the data, wherein the multi-entity profile includes a set of groupings of the data by a set of attributes included in the data (block 420). For example, the report analysis platform (e.g., report analysis platform 230 using computing resource 234, processor 320, and/or the like) may determine a multi-entity profile for the data after receiving the data, in a manner that is the same as or similar to that described elsewhere herein. In some implementations, the multi-entity profile includes a set of groupings of the data by a set of attributes included in the data.

As further shown in FIG. 4, process 400 may include determining, using the multi-entity profile, a set of supervised model features for the historical reports based on the historical audits, wherein the set of supervised model features is associated with training a model to process a report in a context of the historical audits (block 430). For example, the report analysis platform (e.g., report analysis platform 230 using computing resource 234, processor 320, and/or the like) may determine, using the multi-entity profile, a set of supervised model features for the historical reports based on the historical audits, in a manner that is the same as or similar to that described elsewhere herein. In some implementations, the set of supervised model features is associated with training a model to process a report in a context of the historical audits.

As further shown in FIG. 4, process 400 may include determining, using the multi-entity profile, a set of unsupervised model features for the historical reports independent of the historical audits, wherein the set of unsupervised model features is associated with training the model to process the report independent of the context of the historical audits (block 440). For example, the report analysis platform (e.g., report analysis platform 230 using computing resource 234, processor 320, and/or the like) may determine, using the multi-entity profile, a set of unsupervised model features for the historical reports independent of the historical audits, in a manner that is the same as or similar to that described elsewhere herein. In some implementations, the set of unsupervised model features is associated with training the model to process the report independent of the context of the historical audits.

As further shown in FIG. 4, process 400 may include determining, utilizing the model, a score for the report after the model is trained using the set of supervised model features and the set of unsupervised model features, wherein the score indicates a likelihood of an issue related to the report (block 450). For example, the report analysis platform (e.g., report analysis platform 230, using computing resource 234, processor 320, and/or the like) may determine, utilizing the model, a score for the report after the model is trained using the set of supervised model features and the set of unsupervised model features, in a manner that is the same as or similar to that described elsewhere herein. In some implementations, the score indicates a likelihood of an issue related to the report.

As further shown in FIG. 4, process 400 may include performing one or more actions based on the score (block 460). For example, the report analysis platform (e.g., report analysis platform 230 using computing resource 234, processor 320, output component 360, communication interface 370, and/or the like) may perform one or more actions based on the score, in a manner that is the same as or similar to that described elsewhere herein.

Process 400 may include additional implementations, such as any single implementation or any combination of implementations described below and/or in connection with one or more other processes described elsewhere herein.

In some implementations, the report analysis platform may determine the set of supervised model features based on at least one of: a pattern of non-compliant reports included in the historical reports and identified in the historical audits, a linear discriminate analysis of the historical reports and the historical audits, or a text analysis of the historical reports and the historical audits. In some implementations, the report analysis platform may determine the set of unsupervised model features based on at least one of: an intra-individual analysis of the individuals, an inter-individual analysis of the individuals, or a kernel density estimation (KDE) anomaly detection analysis of the historical reports.

In some implementations, the report analysis platform may determine the multi-entity profile based on at least one of: the individuals, vendors associated with the historical reports, or locations associated with the individuals, the vendors, or the organization. In some implementations, the set of supervised model features identifies features of compliant historical reports and non-compliant historical reports included in the historical reports, wherein the non-compliant historical reports include the issue and the compliant historical reports do not include the issue. In some implementations, the set of unsupervised model features identifies features of the historical reports that are indicative of a pattern of the data related to the historical reports. In some implementations, the report analysis platform may flag the report as including the issue or not including the issue based on the score, and may store, in a data structure, information that identifies the report and an identifier that identifies whether the report includes the issue or does not include the issue.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
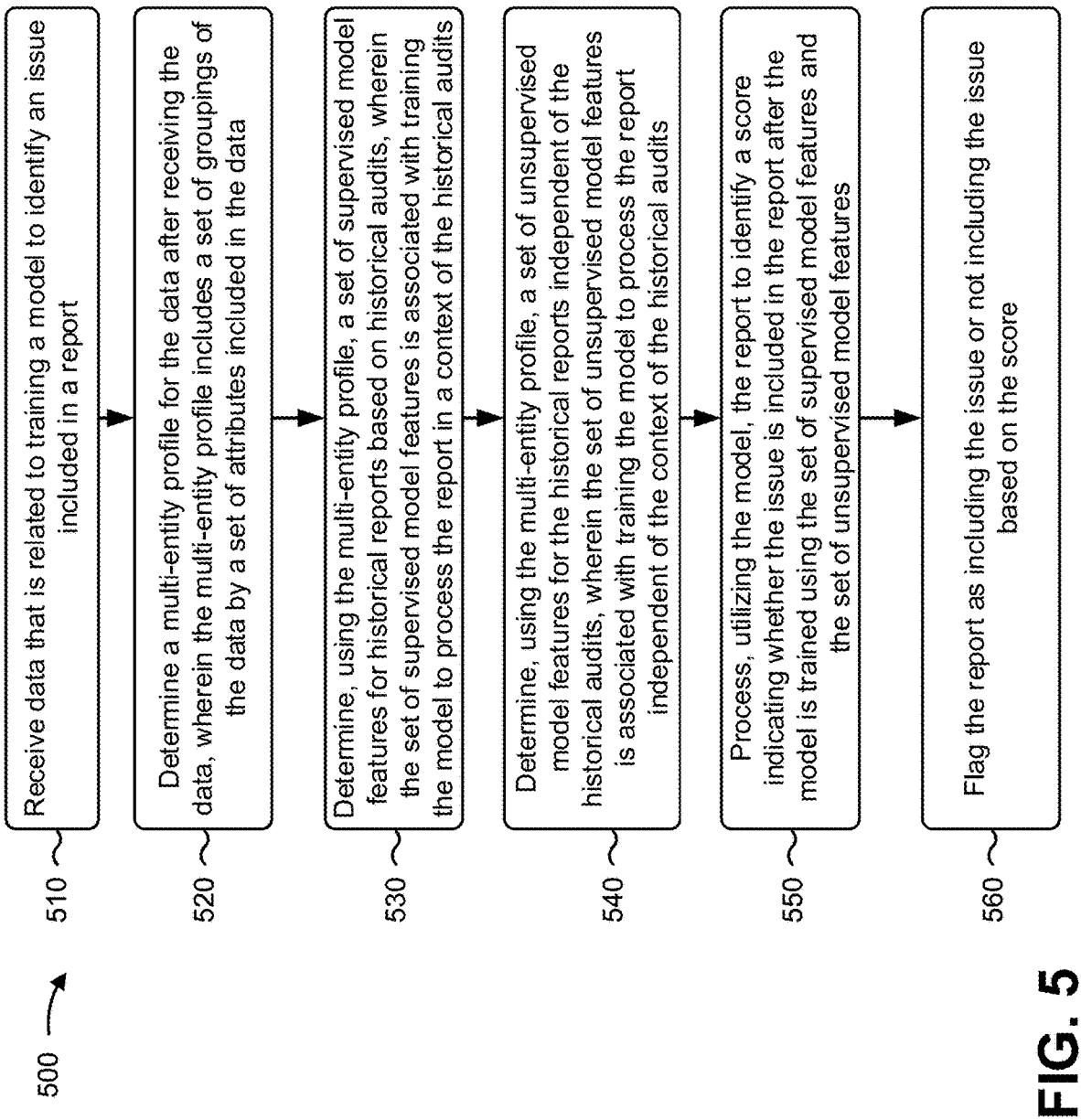
FIG. 5 is a flow chart of an example process for detecting an issue related to a report.

FIG. 5 is a flow chart of an example process 500 for detecting an issue related to a report. In some implementations, one or more process blocks of FIG. 5 may be performed by a report analysis platform (e.g., report analysis platform 230). In some implementations, one or more process blocks of FIG. 5 may be performed by another device or a group of devices separate from or including the report analysis platform, such as a client device (e.g., client device 210), a server device (e.g., server device 220), and a computing resource (e.g., computing resource 234).

As shown in FIG. 5, process 500 may include receiving data that is related to training a model to identify an issue included in a report (block 510). For example, the report analysis platform (e.g., report analysis platform 230 using computing resource 234, processor 320, input component 350, communication interface 370, and/or the like) may receive data that is related to training a model to identify an issue included in a report, in a manner that is the same as or similar to that described elsewhere herein.

As further shown in FIG. 5, process 500 may include determining a multi-entity profile for the data after receiving the data, wherein the multi-entity profile includes a set of groupings of the data by a set of attributes included in the data (block 520). For example, the report analysis platform (e.g., report analysis platform 230 using computing resource 234, processor 320, and/or the like) may determine a multi-entity profile for the data after receiving the data, in a manner that is the same as or similar to that described elsewhere herein. In some implementations, the multi-entity profile includes a set of groupings of the data by a set of attributes included in the data.

As further shown in FIG. 5, process 500 may include determining, using the multi-entity profile, a set of supervised model features for historical reports based on historical audits, wherein the set of supervised model features is associated with training the model to process the report in a context of the historical audits (block 530). For example, the report analysis platform (e.g., report analysis platform 230 using computing resource 234, processor 320, and/or the like) may determine, using the multi-entity profile, a set of supervised model features for historical reports based on historical audits, in a manner that is the same as or similar to that described elsewhere herein. In some implementations, the set of supervised model features is associated with training the model to process the report in a context of the historical audits.

As further shown in FIG. 5, process 500 may include determining, using the multi-entity profile, a set of unsupervised model features for the historical reports independent of the historical audits, wherein the set of unsupervised model features is associated with training the model to process the report independent of the context of the historical audits (block 540). For example, the report analysis platform (e.g., report analysis platform 230 using computing resource 234, processor 320, and/or the like) may determine, using the multi-entity profile, a set of unsupervised model features for the historical reports independent of the historical audits, in a manner that is the same as or similar to that described elsewhere herein. In some implementations, the set of unsupervised model features is associated with training the model to process the report independent of the context of the historical audits.

As further shown in FIG. 5, process 500 may include processing, utilizing the model, the report to identify a score indicating whether the issue is included in the report after the model is trained using the set of supervised model features and the set of unsupervised model features (block 550). For example, report analysis platform (e.g., report analysis platform 230 using computing resource 234, processor 320, and/or the like) may process, utilizing the model, the report to identify a score indicating whether the issue is included in the report after the model is trained using the set of supervised model features and the set of unsupervised model features, in a manner that is the same as or similar to that described elsewhere herein.

As further shown in FIG. 5, process 500 may include flagging the report as including the issue or not including the issue based on the score (block 560). For example, the report analysis platform (e.g., report analysis platform 230 using computing resource 234, processor 320, output component 360, communication interface 370, and/or the like) may flag the report as including the issue or not including the issue based on the score, in a manner that is the same as or similar to that described elsewhere herein.

Process 500 may include additional implementations, such as any single implementation or any combination of implementations described below and/or in connection with one or more other processes described elsewhere herein.

In some implementations, the report analysis platform may train the model, utilizing the set of supervised model features and the set of unsupervised model features, to identify a likelihood of the issue being included in the report. In some implementations, the report analysis platform may process the report to identify the issue included in the report after training the model.

In some implementations, the report analysis platform may determine, utilizing the model, the score for the report after training the model, wherein the score indicates the likelihood of the issue being included in the report, and may flag the report as including the issue after determining the score, wherein the score satisfies a threshold, or flag the report as not including the issue after determining the score, wherein the score fails to satisfy the threshold. In some implementations, the report analysis platform may determine the set of supervised model features based on at least one of: a pattern of non-compliant reports included in the historical reports and identified in the historical audits, a linear discriminate analysis of the historical reports and the historical audits, or a text analysis of the historical reports and the historical audits, and may determine the set of unsupervised model features based on at least one of: an intra-individual analysis of individuals, an inter-individual analysis of the individuals, or a kernel density estimation (KDE) anomaly detection analysis of the historical reports.

In some implementations, the report analysis platform may trigger an alarm after flagging the report as including the issue. In some implementations, the report analysis platform may store a log, related to processing the report, after processing the report, wherein the log identifies whether the report includes the issue or does not include the issue.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
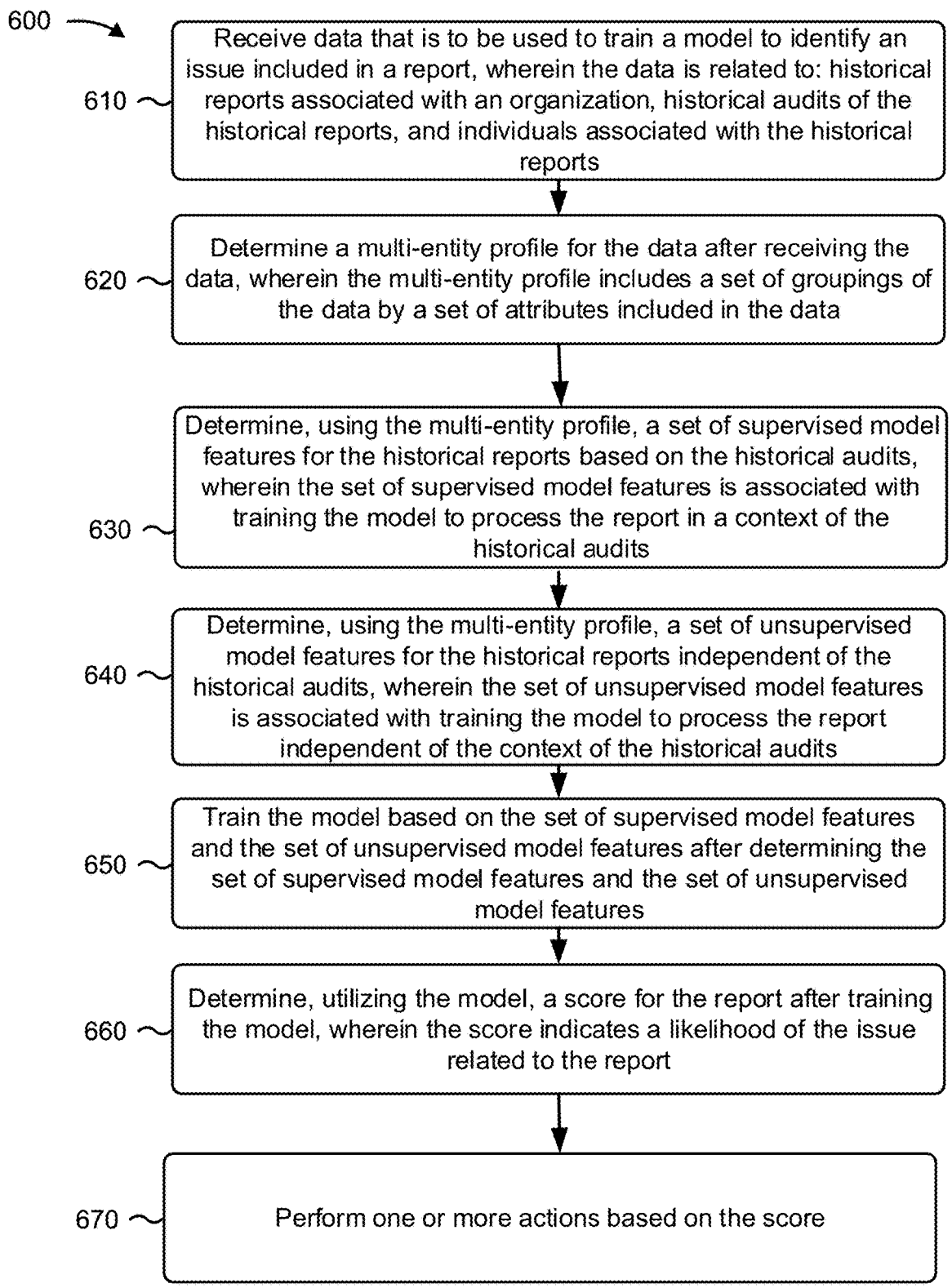
FIG. 6 is a flow chart of an example process for detecting an issue related to a report.

FIG. 6 is a flow chart of an example process 600 for detecting an issue related to a report. In some implementations, one or more process blocks of FIG. 6 may be performed by a report analysis platform (e.g., report analysis platform 230). In some implementations, one or more process blocks of FIG. 6 may be performed by another device or a group of devices separate from or including the report analysis platform, such as a client device (e.g., client device 210), a server device (e.g., server device 220), and a computing resource (e.g., computing resource 234).

As shown in FIG. 6, process 600 may include receiving data that is to be used to train a model to identify an issue included in a report, wherein the data is related to: historical reports associated with an organization, historical audits of the historical reports, and individuals associated with the historical reports (block 610). For example, the report analysis platform (e.g., report analysis platform 230 using computing resource 234, processor 320, input component 350, communication interface 370, and/or the like) may receive data that is to be used to train a model to identify an issue included in a report, in a manner that is the same as or similar to that described elsewhere herein. In some implementations, the data is related to: historical reports associated with an organization, historical audits of the historical reports, and individuals associated with the historical reports.

As further shown in FIG. 6, process 600 may include determining a multi-entity profile for the data after receiving the data, wherein the multi-entity profile includes a set of groupings of the data by a set of attributes included in the data (block 620). For example, the report analysis platform (e.g., report analysis platform 230 using computing resource 234, processor 320, and/or the like) may determine a multi-entity profile for the data after receiving the data, in a manner that is the same as or similar to that described elsewhere herein. In some implementations, the multi-entity profile includes a set of groupings of the data by a set of attributes included in the data.

As further shown in FIG. 6, process 600 may include determining, using the multi-entity profile, a set of supervised model features for the historical reports based on the historical audits, wherein the set of supervised model features is associated with training the model to process the report in a context of the historical audits (block 630). For example, the report analysis platform (e.g., report analysis platform 230 using computing resource 234, processor 320, and/or the like) may determine, using the multi-entity profile, a set of supervised model features for the historical reports based on the historical audits, in a manner that is the same as or similar to that described elsewhere herein. In some implementations, the set of supervised model features is associated with training the model to process the report in a context of the historical audits.

As further shown in FIG. 6, process 600 may include determining, using the multi-entity profile, a set of unsupervised model features for the historical reports independent of the historical audits, wherein the set of unsupervised model features is associated with training the model to process the report independent of the context of the historical audits (block 640). For example, the report analysis platform (e.g., report analysis platform 230 using computing resource 234, processor 320, and/or the like) may determine, using the multi-entity profile, a set of unsupervised model features for the historical reports independent of the historical audits, in a manner that is the same as or similar to that described elsewhere herein. In some implementations, the set of unsupervised model features is associated with training the model to process the report independent of the context of the historical audits.

As further shown in FIG. 6, process 600 may include training the model based on the set of supervised model features and the set of unsupervised model features after determining the set of supervised model features and the set of unsupervised model features (block 650). For example, the report analysis platform (e.g., report analysis platform 230 using computing resource 234, processor 320, and/or the like) may train the model based on the set of supervised model features and the set of unsupervised model features after determining the set of supervised model features and the set of unsupervised model features, in a manner that is the same as or similar to that described elsewhere herein.

As further shown in FIG. 6, process 600 may include determining, utilizing the model, a score for the report after training the model, wherein the score indicates a likelihood of the issue related to the report (block 660). For example, the report analysis platform (e.g., report analysis platform 230 using computing resource 234, processor 320, and/or the like) may determine, utilizing the model, a score for the report after training the model, in a manner that is the same as or similar to that described elsewhere herein. In some implementations, the score indicates a likelihood of the issue related to the report.

As further shown in FIG. 6, process 600 may include performing one or more actions based on the score (block 670). For example, the report analysis platform (e.g., report analysis platform 230 using computing resource 234, processor 320, output component 360, communication interface 370, and/or the like) may perform one or more actions based on the score, in a manner that is the same as or similar to that described elsewhere herein.

Process 600 may include additional implementations, such as any single implementation or any combination of implementations described below and/or in connection with one or more other processes described elsewhere herein.

In some implementations, the report analysis platform may combine the set of supervised model features and the set of unsupervised model features into a super model after determining the set of supervised model features and the set of unsupervised model features, and may train the model utilizing the super model after combining the set of supervised model features and the set of unsupervised model features into the super model. In some implementations, the report analysis platform may combine the set of supervised model features and the set of unsupervised model features into a gradient boosting tree after determining the set of supervised model features and the set of unsupervised model features, wherein the gradient boosting tree is the super model, and may train the model based on the gradient boosting tree after combining the set of supervised model features and the set of unsupervised model features into the gradient boosting tree.

In some implementations, the report analysis platform 230 may send a message to a client device 210 after determining the score, wherein the message includes information that identifies the report, the score, or whether the report includes the issue. In some implementations, the report analysis platform 230 may determine, after determining the score, that the report includes the issue based on the score satisfying a threshold, may identify a type of the issue included in the report after determining that the report includes the issue, and may perform the one or more actions based on the type of the issue after identifying the type of the issue. In some implementations, the report analysis platform 230 may populate a user interface, provided for display via a display associated with a device, with information that identifies the report after identifying the type of the issue, wherein the user interface is associated with the type of the issue and is associated with displaying information related to a set of reports that includes the type of the issue.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, report analysis platform 230 provides a tool that can process reports in a technical and/or objective manner to determine whether the reports include an issue. This improves an accuracy of processing the reports and/or removes waste due to subjectivity of a manual review of the reports. In addition, report analysis platform 230 provides a tool that can be used to process reports as a quantity of reports generated by an organization increases, thereby providing a scalable tool that an organization can use. Further, this reduces or eliminates a need for a manual review of the reports, thereby increasing a flexibility of when the reports are reviewed (e.g., the reports can be reviewed 24-hours a day). Further, this increases a consistency of review of the reports (e.g., which may reduce costs associated with quality control of review of the reports).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, data that is related to:
      historical reports associated with an organization, wherein the historical reports include information associated with operations of the organization,
      historical audits of the historical reports, wherein the historical audits include results of detecting issues in the historical reports, and
      individuals associated with the historical reports;
   determining, by the device, a multi-entity profile for the data after receiving the data,
      wherein the multi-entity profile includes a set of groupings of the data by a set of attributes included in the data;
   identifying, by the device, keywords that are common to the historical audits and the historical reports;
   receiving, by the device, a report after determining that a first threshold quantity of reports have been submitted;
   determining, by the device and using the multi-entity profile, a set of supervised model features for the historical reports based on grouping the historical reports based on the results of the historical audits and based on the identified keywords,
      wherein the set of supervised model features is associated with training a model to process the report in a context of the historical audits, and
      wherein training the model comprises:
         mapping data associated with the historical reports to a set of previously generated supervised model features after labeling the historical reports based on the historical audits of the historical reports,
         determining classifier chains, wherein the labels are correlated based on supervised model features common to different labels of the labels,
         determining an accuracy metric of the labels, and
         training the model based on labels that satisfy a threshold associated with the accuracy metric;
   determining, by the device and using the multi-entity profile, a set of unsupervised model features for the historical reports independent of the grouping of the historical reports,
      wherein the set of unsupervised model features is associated with training the model to process the report independent of the context of the historical audits;
   determining, by the device, based on receiving the report after determining that the first threshold quantity of reports have been submitted, and utilizing the model, a score for the report after the model is trained using both of the set of supervised model features and the set of unsupervised model features,
      wherein the score indicates a likelihood of an issue related to the report; and
   performing, by the device, one or more actions based on the score, wherein the one or more actions comprise:

flagging attributes associated with the report based on the score satisfying a second threshold, and
providing a link to the report.

2. The method of claim 1, wherein determining the set of supervised model features comprises:
determining the set of supervised model features based on at least one of:
a pattern of non-compliant reports included in the historical reports and identified in the historical audits,
a linear discriminate analysis of the historical reports and the historical audits, or
a text analysis of the historical reports and the historical audits.

3. The method of claim 1, wherein determining the set of unsupervised model features comprises:
determining the set of unsupervised model features based on at least one of:
an intra-individual analysis of the individuals,
an inter-individual analysis of the individuals, or
a kernel density estimation (KDE) anomaly detection analysis of the historical reports.

4. The method of claim 1, wherein determining the multi-entity profile comprises:
determining the multi-entity profile based on at least one of:
the individuals,
vendors associated with the historical reports, or
locations associated with the individuals, the vendors, or the organization.

5. The method of claim 1, wherein the set of supervised model features identifies features of compliant historical reports and non-compliant historical reports included in the historical reports,
wherein the non-compliant historical reports include the issue and the compliant historical reports do not include the issue.

6. The method of claim 1, wherein the set of unsupervised model features identifies features of the historical reports that are indicative of a pattern of the data related to the historical reports.

7. The method of claim 1, wherein performing the one or more actions comprises:
flagging the report as including the issue or not including the issue based on the score; and
storing, in a data structure, information that identifies the report and an identifier that identifies whether the report includes the issue or does not include the issue.

8. The method of claim 1, wherein determining the set of supervised model features comprises at least one of:
identifying patterns that are common to a first set of historical reports that have passed a first historical audit of the historical audits, or
identifying patterns that are common to a second set of historical reports that have failed a second historical audit of the historical audits.

9. A device, comprising:
one or more memories; and
one or more processors, communicatively coupled to the one or more memories, to:
receive data that is related to training a model,
wherein the data is associated with:
historical reports associated with an organization,
wherein the historical reports include information associated with operations of the organization,
historical audits of the historical reports,
wherein the historical audits include results of detecting issues in the historical reports, and
determine a multi-entity profile for the data after receiving the data,
wherein the multi-entity profile includes a set of groupings of the data by a set of attributes included in the data;
identify keywords that are common to the historical audits and the historical reports;
receive a report after a threshold quantity of reports have been submitted;
determine, using the multi-entity profile, a set of supervised model features for the historical reports based on grouping the historical reports based on results of the historical audits and based on the identified keywords,
wherein the set of supervised model features is associated with training the model to process the report in a context of the historical audits, and
wherein training the model comprises:
mapping, after labeling the historical reports based on the historical audits of the historical reports, data associated with the historical reports to a set of previously generated supervised model features;
determining classifier chains associated with wherein the labels are correlated based on supervised model features common to different labels of the labels;
determining an accuracy metric of the labels; and
training the model based on labels that satisfy a threshold associated with the accuracy metric;
determine, using the multi-entity profile, a set of unsupervised model features for the historical reports independent of the grouping of the historical reports,
wherein the set of unsupervised model features is associated with training the model to process the report independent of the context of the historical audits;
process, utilizing the model, the report to identify a score indicating whether an issue is included in the report after the model is trained using both of the set of supervised model features and the set of unsupervised model features;
flag the report as including the issue or not including the issue based on the score; and
provide a link to the report.

10. The device of claim 9, wherein the one or more processors are further to:
train the model, utilizing the set of supervised model features and the set of unsupervised model features, to identify a likelihood of the issue being included in the report.

11. The device of claim 10, wherein the one or more processors, when processing the report, are to:
process the report to identify the issue included in the report after training the model.

12. The device of claim 11, wherein the threshold is a first threshold, and
wherein the one or more processors, when processing the report, are to:
determine, utilizing the model, the score for the report after training the model,
wherein the score indicates the likelihood of the issue being included in the report; and
wherein the one or more processors, when flagging the issue, are to:

flag the report as including the issue after determining the score,
    wherein the score satisfies a second threshold, or
flag the report as not including the issue after determining the score,
    wherein the score fails to satisfy the second threshold.

13. The device of claim 9, wherein the one or more processors, when determining the set of supervised model features, are to:
    determine the set of supervised model features based on at least one of:
        a pattern of non-compliant reports included in the historical reports and identified in the historical audits,
        a linear discriminate analysis of the historical reports and the historical audits, or
        a text analysis of the historical reports and the historical audits; and
    wherein the one or more processors, when determining the set of unsupervised model features, are to:
        determine the set of unsupervised model features based on at least one of:
            an intra-individual analysis of individuals,
            an inter-individual analysis of the individuals, or
            a kernel density estimation (KDE) anomaly detection analysis of the historical reports.

14. The device of claim 9, wherein the one or more processors are further to:
    trigger an alarm after flagging the report as including the issue.

15. The device of claim 9, wherein the one or more processors are further to:
    store a log, related to processing the report, after processing the report,
        wherein the log identifies whether the report includes the issue or does not include the issue.

16. A non-transitory computer-readable medium storing instructions, the instructions comprising:
    one or more instructions that, when executed by one or more processors, cause the one or more processors to:
        receive data that is to be used to train a model,
            wherein the data is related to:
                historical reports associated with an organization,
                    wherein the historical reports include information associated with operations of the organization,
                historical audits of the historical reports,
                    wherein the historical audits include results of detecting issues in the historical reports, and
                individuals associated with the historical reports;
        determine a multi-entity profile for the data after receiving the data,
            wherein the multi-entity profile includes a set of groupings of the data by a set of attributes included in the data;
        identify keywords that are common to the historical audits and the historical reports;
        receive a report after a first threshold quantity of reports have been submitted;
        determine, using the multi-entity profile, a set of supervised model features for the historical reports based on grouping the historical reports based on results of the historical audits and based on the identified keywords,
            wherein the set of supervised model features is associated with training the model to process the report in a context of the historical audits, and
            wherein training the model comprises:
                mapping, after labeling the historical reports based on the historical audits of the historical reports, data associated with the historical reports to a set of previously generated supervised model features;
                determining classifier chains associated with
                    wherein the labels are correlated based on supervised model features common to different labels of the labels;
                determining an accuracy metric of the labels; and
                training the model based on labels that satisfy a threshold associated with the accuracy metric;
        determine, using the multi-entity profile, a set of unsupervised model features for the historical reports independent of the grouping of the historical reports,
            wherein the set of unsupervised model features is associated with training the model to process the report independent of the context of the historical audits;
        train the model based on both of the set of supervised model features and the set of unsupervised model features after determining the set of supervised model features and the set of unsupervised model features;
        determine, utilizing the model, a score for the report after training the model,
            wherein the score indicates a likelihood of an issue related to the report; and
        perform one or more actions based on the score,
            wherein the one or more actions comprise:
                flagging attributes associated with the report based on the score satisfying a second threshold, and
                providing a link to the report.

17. The non-transitory computer-readable medium of claim 16, wherein the one or more instructions, when executed by the one or more processors, further cause the one or more processors to:
    combine the set of supervised model features and the set of unsupervised model features into a super model after determining the set of supervised model features and the set of unsupervised model features; and
    wherein the one or more instructions, that cause the one or more processors to train the model, cause the one or more processors to:
        train the model utilizing the super model after combining the set of supervised model features and the set of unsupervised model features into the super model.

18. The non-transitory computer-readable medium of claim 17, wherein the one or more instructions, that cause the one or more processors to combine the set of supervised model features and the set of unsupervised model features into the super model, cause the one or more processors to:
    combine the set of supervised model features and the set of unsupervised model features into a gradient boosting tree after determining the set of supervised model features and the set of unsupervised model features,
        wherein the gradient boosting tree is the super model; and
    wherein the one or more instructions, that cause the one or more processors to train the model, cause the one or more processors to:

train the model based on the gradient boosting tree after combining the set of supervised model features and the set of unsupervised model features into the gradient boosting tree.

19. The non-transitory computer-readable medium of claim 16, wherein the one or more instructions, that cause the one or more processors to perform the one or more actions, cause the one or more processors to:
send a message to a client device after determining the score,
wherein the message includes information that identifies the report, the score, or whether the report includes the issue.

20. The non-transitory computer-readable medium of claim 16, wherein the one or more instructions, when executed by the one or more processors, further cause the one or more processors to:
determine, after determining the score, that the report includes the issue based on the score satisfying the second threshold;
identify a type of the issue included in the report after determining that the report includes the issue; and
wherein the one or more instructions, that cause the one or more processors to perform the one or more actions, cause the one or more processors to:
perform the one or more actions based on the type of the issue after identifying the type of the issue.

\* \* \* \* \*